United States Patent
Xie

(10) Patent No.: US 10,091,834 B2
(45) Date of Patent: Oct. 2, 2018

(54) STATUS DETECTION METHOD, APPARATUS, AND SYSTEM

(71) Applicant: Huawei Technologies Co., Ltd., Shenzhen (CN)

(72) Inventor: Yong Xie, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 15/418,974

(22) Filed: Jan. 30, 2017

(65) Prior Publication Data

US 2017/0142776 A1 May 18, 2017

Related U.S. Application Data

(63) Continuation of application No. PCT/CN2014/083347, filed on Jul. 30, 2014.

(51) Int. Cl.
| | |
|---|---|
| *H04W 76/36* | (2018.01) |
| *H04W 60/02* | (2009.01) |
| *H04M 3/42* | (2006.01) |
| *H04L 5/00* | (2006.01) |
| *H04L 12/751* | (2013.01) |
| *H04W 76/06* | (2009.01) |

(52) U.S. Cl.
CPC .......... *H04W 76/36* (2018.02); *H04L 5/0055* (2013.01); *H04L 45/026* (2013.01); *H04M 3/4217* (2013.01); *H04W 60/02* (2013.01); *H04W 76/066* (2013.01)

(58) Field of Classification Search
CPC ... H04W 76/066; H04W 60/02; H04W 76/66; H04L 5/0055; H04L 45/026; H04M 3/4217; H04M 3/42173
See application file for complete search history.

(56) References Cited

U.S. PATENT DOCUMENTS

| | | | | |
|---|---|---|---|---|
| 2009/0186643 A1* | 7/2009 | Yuan | ...................... | H04W 4/14 |
| | | | | 455/466 |
| 2011/0294506 A1* | 12/2011 | Claussen | ................. | H04W 8/10 |
| | | | | 455/435.1 |
| 2012/0264455 A1* | 10/2012 | Yasuoka | ................. | H04W 4/02 |
| | | | | 455/456.2 |

FOREIGN PATENT DOCUMENTS

| | | |
|---|---|---|
| CN | 102026088 A | 4/2011 |
| CN | 102083109 A | 6/2011 |
| CN | 102215524 A | 10/2011 |
| CN | 103026778 A | 4/2013 |
| CN | 103843418 A | 6/2014 |
| EP | 2637365 A2 | 9/2013 |

(Continued)

*Primary Examiner* — Joseph Dean, Jr.
(74) *Attorney, Agent, or Firm* — Slater Matsil, LLP

(57) ABSTRACT

Embodiments provide a status detection method, an apparatus, and a system. The method includes receiving, by a wireless network entity, a detection registration request message sent by UE or a server corresponding to a client in UE, where the detection registration request message is used to request to register status detection with the wireless network entity, and the status detection includes at least one of online detection or update detection; completing, by the wireless network entity, registration of the status detection according to the detection registration request message; and performing, by the wireless network entity, the status detection. The method also includes sending a result of the status detection.

19 Claims, 9 Drawing Sheets

A server sends a detection registration request message to a wireless network entity, where the detection registration request message is used to request to register status detection with the wireless network entity, and the status detection includes at least one of online detection or update detection — S301

(56) References Cited

FOREIGN PATENT DOCUMENTS

EP          2640097  A1    9/2013
WO      2013143228  A1   10/2013

* cited by examiner

STATUS DETECTION METHOD, APPARATUS, AND SYSTEM

CROSS-REFERENCE TO RELATED APPLICATIONS

This application is a continuation of International Application No. PCT/CN2014/083347, filed on Jul. 30, 2014, the disclosure of which is hereby incorporated by reference in its entirety.

TECHNICAL FIELD

The present invention relates to the communications field, and in particular, to a status detection method, an apparatus, and a system.

BACKGROUND

The continuous development of UE (User equipment) has resulted in an increasing number of applications, that is, clients installed on the user equipment. When these clients run, the UE generally needs to frequently exchange information with a server on a network side.

In the prior art, in one aspect, the UE and the server may periodically send a detection packet to each other, so as to separately detect online statuses of a client in the UE and the server, and this detection on an online status is referred to as online detection. In another aspect, the UE may periodically send a detection packet to the server, so as to detect whether a new message arrives at the server, and this detection on whether the new message arrives at the server is referred to as update detection. For wireless communication, an air interface connection needs to be first established between a wireless network entity and UE before the foregoing two detection packets are sent. When data is transmitted between the server and the UE, the air interface connection is maintained. When no data is transmitted between the server and the UE within a preset time, the air interface connection is released, so as to save an air interface resource. The preset time is referred to as a time during which the air interface connection is maintained.

However, if a time during which an air interface connection is maintained is shorter than a detection packet sending period, the UE needs to re-establish an air interface connection to the wireless network entity each time a detection packet is sent. If a time during which an air interface connection is maintained is longer than a detection packet sending period, the air interface connection is maintained between the UE and the wireless network entity each time a detection packet is sent. Therefore, a detection method is urgently required to change current situations in which the UE frequently establishes an air interface connection to the wireless network entity, and an air interface connection is maintained between the UE and the wireless network entity for a long time.

SUMMARY

Embodiments provide a status detection method, an apparatus, and a system, which can provide a detection method that changes current situations in which UE frequently establishes an air interface connection to a wireless network entity, and an air interface connection is maintained between the UE and the wireless network entity for a long time.

To achieve the foregoing objectives, the following technical solutions are used in the present embodiments.

According to a first aspect, the present embodiments provide a status detection method, including receiving, by a wireless network entity, a detection registration request message sent by user equipment UE or a server corresponding to a client in the UE, where the detection registration request message is used to request to register status detection with the wireless network entity, and the status detection includes at least one of online detection or update detection. The method also includes completing, by the wireless network entity, registration of the status detection according to the detection registration request message. Additionally, the method includes performing, by the wireless network entity, the status detection, and sending a result of the status detection.

In a first possible implementation manner of the first aspect, the status detection is the online detection, and the performing, by the wireless network entity, the status detection, and sending a result of the status detection includes: obtaining, by the wireless network entity, a protocol message reported by the UE; sending, by the wireless network entity, a first heartbeat notification message to the server according to the protocol message, where the first heartbeat notification message indicates that the client is in an online state; and sending, by the wireless network entity, a second heartbeat notification message to the client according to the protocol message, where the second heartbeat notification message indicates that the server is in an online state.

In a second possible implementation manner of the first aspect, the status detection is the update detection, and the performing, by the wireless network entity, the status detection, and sending a result of the status detection includes: sending, by the wireless network entity, an update detection message to the server; receiving, by the wireless network entity, an update acknowledgement message sent by the server; and if the update acknowledgement message indicates that the server obtains a new message, sending, by the wireless network entity, an update notification message to the client, where the update notification message indicates that the server obtains the new message, and instructs the client to obtain the new message from the server.

With reference to any one of the foregoing first aspect, the first possible implementation manner of the first aspect, or the second possible implementation manner of the first aspect, in a third possible implementation manner, the receiving, by a wireless network entity, a detection registration request message sent by UE, and completing, by the wireless network entity, registration of the status detection according to the detection registration request message includes: receiving, by the wireless network entity, a first detection registration request message sent by the UE, where the first detection registration request message carries information that indicates a status detection period suggested by the UE; determining, by the wireless network entity according to the information that indicates the status detection period suggested by the UE, information that indicates a status detection period provided by the wireless network entity; sending, by the wireless network entity, a second detection registration request message to the server, where the second detection registration request message carries the information that indicates the status detection period provided by the wireless network entity; receiving, by the wireless network entity, a first detection registration acknowledgement message that allows the wireless network entity to perform the status detection and that is sent by the server, where the first detection registration acknowledgement message carries information that indicates a status detection period accepted by the server; and sending, by the wireless network entity, a second detection registration acknowledgement message to the UE, where the second detection registration acknowledgement message carries the information that indicates the status detection period accepted by the server.

With reference to any one of the foregoing first aspect, the first possible implementation manner of the first aspect, or the second possible implementation manner of the first aspect, in a fourth possible implementation manner, the receiving, by a wireless network entity, a detection registration request message sent by a server, and completing, by the wireless network entity, registration of the status detection according to the detection registration request message includes: receiving, by the wireless network entity, a third detection registration request message sent by the server, where the third detection registration request message carries information that indicates a status detection period provided by the server; determining, by the wireless network entity according to the information that indicates the status detection period provided by the server, information that indicates a status detection period accepted by the wireless network entity; sending, by the wireless network entity, a fourth detection registration request message to the UE, where the fourth detection registration request message carries the information that indicates the status detection period accepted by the wireless network entity; receiving, by the wireless network entity, a third detection registration acknowledgement message sent by the UE; and sending, by the wireless network entity, a fourth detection registration acknowledgement message to the server.

According to a second aspect, the present embodiments provide a status detection method, including sending, by user equipment UE, a detection registration request message to a wireless network entity, where the detection registration request message is used to request to register status detection with the wireless network entity, and the status detection includes at least one of online detection or update detection. The method also includes receiving, by the UE, a result of the status detection that is sent by the wireless network entity.

In a first possible implementation manner of the second aspect, the status detection is the online detection, and before the receiving, by the UE, a result of the status detection that is sent by the wireless network entity, the method further includes: reporting, by the UE, a protocol message to the wireless network entity; and the receiving, by the UE, a result of the status detection that is sent by the wireless network entity includes: receiving, by the UE, a heartbeat notification message sent by the wireless network entity, where the heartbeat notification message indicates that a server corresponding to a client in the UE is in an online state.

In a second possible implementation manner of the second aspect, the status detection is the update detection, and the receiving, by the UE, a result of the status detection that is sent by the wireless network entity includes: receiving, by the UE, an update notification message sent by the wireless network entity, where the update notification message indicates that a server corresponding to a client in the UE obtains a new message; and after the receiving, by the UE, an update notification message sent by the wireless network entity, the method further includes: obtaining, by the UE, the new message from the server according to the update notification message.

With reference to any one of the foregoing second aspect, the first possible implementation manner of the second aspect, or the second possible implementation manner of the second aspect, in a third possible implementation manner, the detection registration request message carries information that indicates a status detection period suggested by the UE; and after the sending, by UE, a detection registration request message to a wireless network entity, the method further includes: receiving, by the UE, a detection registration acknowledgement message sent by the wireless network entity, where the detection registration acknowledgement message carries information that indicates a status detection period accepted by the server.

According to a third aspect, the present embodiments provide a wireless network entity, including: a receiving unit, configured to receive a detection registration request message sent by user equipment UE or a server corresponding to a client in the UE, where the detection registration request message is used to request to register status detection with the wireless network entity, and the status detection includes at least one of online detection or update detection; a registration unit, configured to complete registration of the status detection according to the detection registration request message received by the receiving unit; a detection unit, configured to perform the status detection after the registration unit completes the registration of the status detection; and a sending unit, configured to send a result of the status detection performed by the detection unit.

In a first possible implementation manner of the third aspect, the status detection is the online detection, and the detection unit specifically includes an obtaining subunit, where the obtaining subunit is configured to obtain a protocol message reported by the UE; and the sending unit is specifically configured to: according to the protocol message obtained by the obtaining subunit, send a first heartbeat notification message to the server, and send a second heartbeat notification message to the client, where the first heartbeat notification message indicates that the client is in an online state, and the second heartbeat notification message indicates that the server is in an online state.

In a second possible implementation manner of the third aspect, the status detection is the update detection, and the detection unit specifically includes a first sending subunit and a first receiving subunit, where the first sending subunit is configured to send an update detection message to the server; the first receiving subunit is configured to receive an update acknowledgement message sent by the server; and the sending unit is specifically configured to send an update notification message to the client if the update acknowledgement message received by the first receiving subunit indicates that the server obtains a new message, where the update notification message indicates that the server obtains the new message, and instructs the client to obtain the new message from the server.

With reference to any one of the foregoing third aspect, the first possible implementation manner of the third aspect, or the second possible implementation manner of the third aspect, in a third possible implementation manner, the registration unit specifically includes a second sending subunit, a second receiving subunit, and a determining subunit, where the receiving unit is specifically configured to receive a first detection registration request message sent by the UE, where the first detection registration request message carries information that indicates a status detection period suggested by the UE; the determining subunit is configured to determine, according to the information that indicates the status detection period suggested by the UE, information that indicates a status detection period provided by the wireless network entity; the second sending subunit is configured to send a second detection registration request message to the server, where the second detection registration request message carries the information that indicates the status detection period provided by the wireless network entity; the second receiving subunit is configured to receive a first detection registration acknowledgement message that allows the wireless network entity to perform the status detection and that is sent by the server, where the first detection registration acknowledgement message carries information that indicates a status detection period accepted by the server; and the second sending subunit is further configured to send a second detection registration acknowledgement message to the UE, where the second detection registration acknowledgement message carries the information that indicates the status detection period accepted by the server.

With reference to any one of the foregoing third aspect, the first possible implementation manner of the third aspect, or the second possible implementation manner of the third aspect, in a fourth possible implementation manner, the registration unit specifically includes a second sending subunit, a second receiving subunit, and a determining subunit, where the receiving unit is specifically configured to receive a third detection registration request message sent by the server, where the third detection registration request message carries information that indicates a status detection period provided by the server; the determining subunit is configured to determine, according to the information that indicates the status detection period provided by the server, information that indicates a status detection period accepted by the wireless network entity; the second sending subunit is configured to send a fourth detection registration request message to the UE, where the fourth detection registration request message carries the information that indicates the status detection period accepted by the wireless network entity; the second receiving subunit is configured to receive a third detection registration acknowledgement message sent by the UE; and the second sending subunit is further configured to send a fourth detection registration acknowledgement message to the server.

According to a fourth aspect, the present embodiments provide user equipment (UE), including a client and a wireless control module (WCM), where the client runs on the UE, and the WCM provides a radio interface for the client, where the WCM is configured to: send, to a wireless network entity, a detection registration request message triggered by the client, and receive a result of status detection that is sent by the wireless network entity, where the detection registration request message is used to request to register the status detection with the wireless network entity, and the status detection includes at least one of online detection or update detection.

In a first possible implementation manner of the fourth aspect, the status detection is the online detection, and the WCM is further configured to report a protocol message to the wireless network entity before receiving the result of the status detection that is sent by the wireless network entity; and the WCM is specifically configured to: receive a heartbeat notification message sent by the wireless network entity, and send the heartbeat notification message to the client, where the heartbeat notification message indicates that a server corresponding to the client is in an online state.

In a second possible implementation manner of the fourth aspect, the status detection is the update detection, and the WCM is specifically configured to: receive an update notification message sent by the wireless network entity, and send the update notification message to the client, where the update notification message indicates that a server corresponding to the client obtains a new message; and the client is configured to obtain the new message from the server according to the update notification message after receiving the update notification message sent by the WCM.

With reference to any one of the foregoing fourth aspect, the first possible implementation manner of the fourth aspect, or the second possible implementation manner of the fourth aspect, in a third possible implementation manner, the detection registration request message sent by the WCM carries information that indicates a status detection period suggested by the UE; and the WCM is further configured to: after sending the detection registration request message to the wireless network entity, receive a detection registration acknowledgement message sent by the wireless network entity, and send the detection registration acknowledgement message to the client, where the detection registration acknowledgement message carries information that indicates a status detection period accepted by the server.

According to a fifth aspect, the present embodiments provide a wireless network entity, including: a receiver, configured to receive a detection registration request message sent by user equipment UE or a server corresponding to a client in the UE, where the detection registration request message is used to request to register status detection with the wireless network entity, and the status detection includes at least one of online detection or update detection; a processor, configured to: complete registration of the status detection according to the detection registration request message received by the receiver, and perform the status detection; and a transmitter, configured to send a result of the status detection performed by the processor.

In a first possible implementation manner of the fifth aspect, the status detection is the online detection, and the processor is specifically configured to obtain, by using the receiver, a protocol message reported by the UE; and the transmitter is specifically configured to: according to the protocol message obtained by the processor, send a first heartbeat notification message to the server, and send a second heartbeat notification message to the client, where the first heartbeat notification message indicates that the client is in an online state, and the second heartbeat notification message indicates that the server is in an online state.

In a second possible implementation manner of the fifth aspect, the status detection is the update detection, and the processor is specifically configured to: send an update detection message to the server by using the transmitter, and receive, by using the receiver, an update acknowledgement message sent by the server; and the transmitter is specifically configured to send an update notification message to the client if the update acknowledgement message received by the processor indicates that the server obtains a new message, where the update notification message indicates that the server obtains the new message, and instructs the client to obtain the new message from the server.

With reference to any one of the foregoing fifth aspect, the first possible implementation manner of the fifth aspect, or the second possible implementation manner of the fifth aspect, in a third possible implementation manner, the receiver is specifically configured to receive a first detection registration request message sent by the UE, where the first detection registration request message carries information that indicates a status detection period suggested by the UE; and the processor is specifically configured to: determine, according to the information that indicates the status detection period suggested by the UE, information that indicates a status detection period provided by the wireless network entity; send a second detection registration request message to the server by using the transmitter; receive, by using the receiver, a first detection registration acknowledgement message that allows the wireless network entity to perform the status detection and that is sent by the server; and send a second detection registration acknowledgement message to the UE by using the transmitter, where the second detection registration request message carries the information that indicates the status detection period provided by the wireless network entity, the first detection registration acknowledgement message carries information that indicates a status detection period accepted by the server, and the second detection registration acknowledgement message carries the information that indicates the status detection period accepted by the server.

With reference to any one of the foregoing fifth aspect, the first possible implementation manner of the fifth aspect, or the second possible implementation manner of the fifth aspect, in a fourth possible implementation manner, the receiver is specifically configured to receive a third detection registration request message sent by the server, where the third detection registration request message carries information that indicates a status detection period provided by the server; and the processor is specifically configured to: determine, according to the information that indicates the status detection period provided by the server, information that indicates a status detection period accepted by the wireless network entity; send a fourth detection registration request message to the UE by using the transmitter; receive, by using the receiver, a third detection registration acknowledgement message sent by the UE; and send a fourth detection registration acknowledgement message to the server by using the transmitter, where the fourth detection registration request message carries the information that indicates the status detection period accepted by the wireless network entity.

According to a sixth aspect, the present embodiments provide user equipment UE, including: a transmitter, configured to send a detection registration request message to a wireless network entity, where the detection registration request message is used to request to register status detection with the wireless network entity, and the status detection includes at least one of online detection or update detection; and a receiver, configured to receive a result of the status detection that is sent by the wireless network entity.

In a first possible implementation manner of the sixth aspect, the status detection is the online detection, the UE further includes a processor, and the processor is configured to report a protocol message to the wireless network entity before the receiver receives the result of the status detection that is sent by the wireless network entity; and the receiver is specifically configured to receive a heartbeat notification message sent by the wireless network entity, where the heartbeat notification message indicates that a server corresponding to a client in the UE is in an online state.

In a second possible implementation manner of the sixth aspect, the status detection is the update detection, the UE further includes a processor, and the receiver is specifically configured to receive an update notification message sent by the wireless network entity, where the update notification message indicates that a server corresponding to a client in the UE obtains a new message; and the processor is configured to: after the receiver receives the update notification message sent by the wireless network entity, obtain the new message from the server according to the update notification message received by the receiver.

With reference to any one of the foregoing sixth aspect, the first possible implementation manner of the sixth aspect, or the second possible implementation manner of the sixth aspect, in a third possible implementation manner, the detection registration request message sent by the transmitter carries information that indicates a status detection period suggested by the UE; and the receiver is further configured to: after the transmitter sends the detection registration request message to the wireless network entity, receive a detection registration acknowledgement message sent by the wireless network entity, where the detection registration acknowledgement message carries information that indicates a status detection period accepted by the server.

According to a seventh aspect, the present embodiments provide a wireless communications system, including: the wireless network entity according to the foregoing third aspect, and the user equipment UE according to the foregoing fourth aspect, and a server corresponding to a client in the UE; or the wireless network entity according to the foregoing fifth aspect, and the UE according to the foregoing sixth aspect, and a server corresponding to a client in the UE.

The present embodiments provide a status detection method, an apparatus, and a system. A wireless network entity receives a detection registration request message sent by UE or a server corresponding to a client in UE, where the detection registration request message is used to request to register status detection with the wireless network entity, and the status detection includes at least one of online detection or update detection; the wireless network entity completes registration of the status detection according to the detection registration request message; and the wireless network entity performs the status detection, and sends a result of the status detection. According to the solutions, after the wireless network entity completes the registration that is of the status detection and initiated by the UE or the server corresponding to the client in the UE, the wireless network entity may perform the status detection, and send the result of the status detection, that is, the wireless network entity may take the place of the UE to perform the status detection. Therefore, compared with a prior-art method in which the UE needs to periodically send a detection packet for status detection, the status detection method provided in the embodiments of the present embodiments can change current situations in which the UE frequently establishes an air interface connection to the wireless network entity, and an air interface connection is maintained between the UE and the wireless network entity for a long time.

BRIEF DESCRIPTION OF THE DRAWINGS

To describe the technical solutions in the embodiments more clearly, the following briefly introduces the accompanying drawings required for describing the embodiments or the prior art. Apparently, the accompanying drawings in the following description show merely some embodiments.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely some but not all of the embodiments.

Various technologies described in the specification may be applied to various wireless communications networks. The wireless communications networks may be any network connected by means of wireless, and include but not limited to GSM (Global System for Mobile Communications), a GPRS (general packet radio service) system, a WCDMA (Wideband Code Division Multiple Access wireless) system, a CDMA (Code Division Multiple Access) 2000 system, an LTE (Long Term Evolution) system, a WIMAX (worldwide interoperability for microwave access) system, a Wi-Fi (Wireless-Fidelity) system, a prospective system in which the 4G (the 4-Generation mobile communication technology) is applied, and a prospective system in which the 5G (the 5-Generation mobile communication technology) is applied.

A user equipment (UE) provided in the embodiments may be a wireless terminal. The wireless terminal may be a device that provides voice and/or data connectivity only for a user, a handheld device with a wireless connection function, or another processing device connected to a wireless modem. The wireless terminal may be a mobile terminal such as a mobile phone (or referred to as a "cellular" phone) and a computer with a mobile terminal, which is, for example, a portable, pocket-sized, handheld, computer built-in, or in-vehicle mobile apparatus. They exchange voice and/or data with a radio access network.

Embodiment 1

Figure 1:
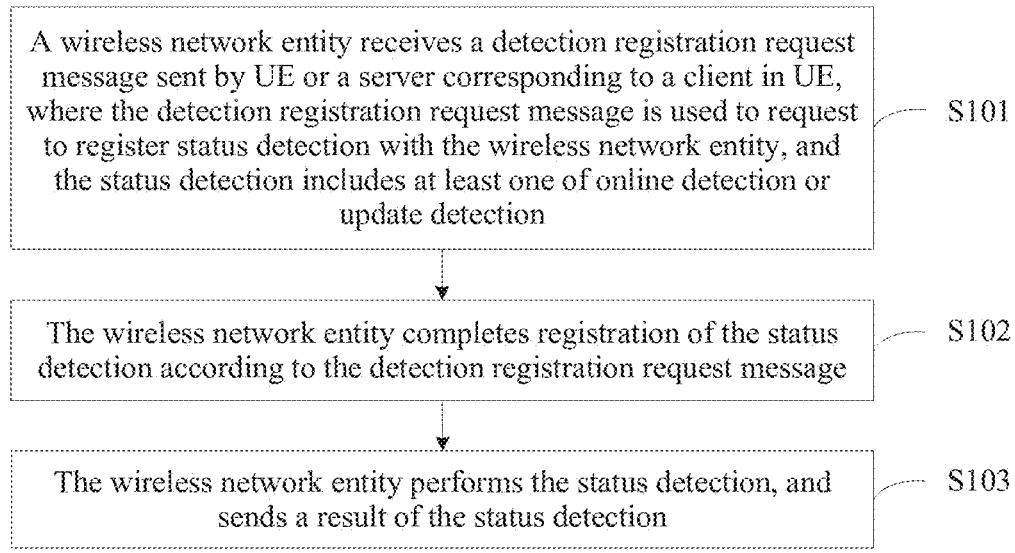
FIG. 1 is a flowchart 1 of a status detection method according to an embodiment.

This embodiment provides a status detection method, where the status detection method relates to a wireless network entity side. As shown in FIG. 1, the status detection method may include.

S101. A wireless network entity receives a detection registration request message sent by UE or a server corresponding to a client in UE, where the detection registration request message is used to request to register status detection with the wireless network entity, and the status detection includes at least one of online detection or update detection.

S102. The wireless network entity completes registration of the status detection according to the detection registration request message.

S103. The wireless network entity performs the status detection, and sends a result of the status detection.

After the UE is connected to a wireless network, the client in the UE is started and connected to a network-side server corresponding to the client. After the client completes the connection to the server, the client may initiate registration of the status detection to the wireless network entity by using the UE, or the server may initiate registration of the status detection to the wireless network entity, that is, the UE or the server may send the detection registration request message to the wireless network entity. After receiving the detection registration request message sent by the UE or the server, the wireless network entity may complete the registration of the status detection according to the detection registration request message, perform the status detection, and send the result of the status detection. The detection registration request message may be used to request to register the status detection with the wireless network entity, and the status detection may include at least one of the online detection or the update detection. A specific process in which the wireless network entity completes the registration of the status detection, a specific process in which the wireless network entity performs the status detection, and a specific process in which the wireless network entity sends the result of the status detection are detailed in subsequent embodiments.

That the foregoing status detection may include at least one of the online detection or the update detection may be understood as: the status detection may include the online detection; or the status detection may include the update detection; or the status detection may include both the online detection and the update detection.

Specifically, the status detection may include at least one of the online detection or the update detection. Therefore, if the status detection is the online detection, after performing the online detection, the wireless network entity may send a result of the online detection to both the UE and the server corresponding to the client in the UE; and the UE may transmit the result of the online detection to the client after receiving the result of the online detection. If the status detection is the update detection, after performing the update detection, the wireless network entity may send a result of the update detection to the UE; and the UE transmits the result of the update detection to the client.

It should be noted that the UE provided in this embodiment may include a client and a WCM (Wireless Control Module), where the client may be an APP (Application) installed on the UE, and the WCM may be a wireless communications module in the UE and is mainly responsible for processing a wireless communications protocol and a wireless communication function that are in the UE. Information exchange between the APP and the wireless network entity and between the APP and the server by using the UE needs to be performed by using the WCM.

The application installed on the UE may obtain, by using the server corresponding to the application, data from an application installed on another UE. Exemplarily, it is assumed that there are two UEs: UE 1 and UE 2 respectively, and an application is installed on each of the UE 1 and the UE 2, when the application in the UE 1 needs to obtain data sent by the application in the UE 2, the application in the UE 1 needs to obtain, from a server corresponding to the application, the data sent by the application in the UE 2.

It may be understood that the client refers to an application that provides a service for a customer and that corresponds to the server. The application may be installed on the UE, and the application requires a service to be provided for the application by a network-side server corresponding to the application. Generally, the application and the server need to be in an online state, to ensure normal interaction between the application and the server.

Particularly, the server provided in this embodiment is a network-side server corresponding to the client in the UE, that is, the server may provide a service for the client.

Further, the foregoing wireless network entity may be an SGSN (Serving GPRS Support Node), a BSC (Base Station Controller), a BTS (Base Transceiver Station), or the like on a GPRS network; or may be an RNC (Radio Network Controller), a NodeB (NodeB), or the like on a WCDMA network; or may be an MME (Mobility Management Entity), an eNodeB (evolved NodeB), or the like on an LTE core network; or may be a wireless network entity on another wireless network; or may be a wireless network entity on a wireless network that probably appears in the future. The present embodiments set no limitation.

Further, the status detection provided in this embodiment includes but is not limited to the foregoing two types of detection: the online detection and the update detection, that is, the status detection provided in this embodiment may be any detection that needs to be performed by periodically sending functional data. The present embodiments set no limitation.

Figure 2:
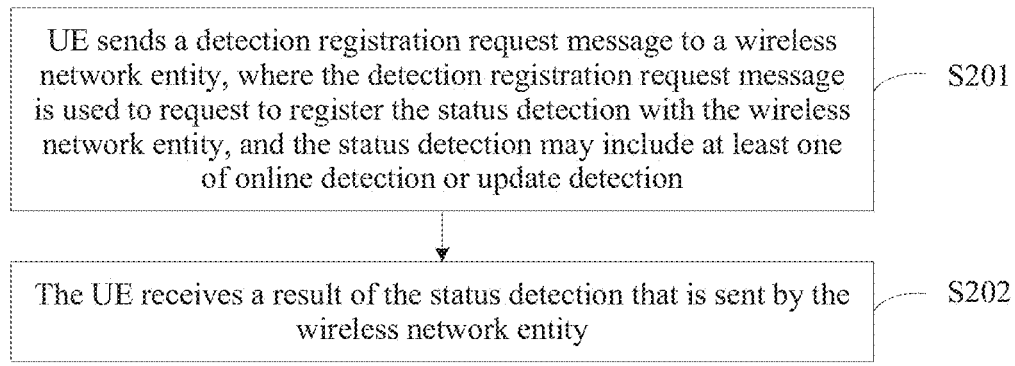
FIG. 2 is a flowchart 2 of a status detection method according to an embodiment.

This embodiment provides a status detection method, where the status detection method relates to a UE side. As shown in FIG. 2, the status detection method may include:

S201. UE sends a detection registration request message to a wireless network entity, where the detection registration request message is used to request to register the status detection with the wireless network entity, and the status detection may include at least one of online detection or update detection.

S202. The UE receives a result of the status detection that is sent by the wireless network entity.

After the UE is connected to a wireless network, a client in the UE is started and connected to a network-side server corresponding to the client. After the client completes the connection to the server, the client may initiate registration of the status detection to the wireless network entity by using the UE, that is, the UE may send the detection registration request message to the wireless network entity. The wireless network entity completes the registration of the status detection according to the detection registration request message, and performs the status detection. After the wireless network entity performs the status detection, the wireless network entity may send the result of the status detection to the UE, and the UE sends the result of the status detection to the client, that is, the client receives the result of the status detection performed by the wireless network entity. The status detection may include at least one of the online detection or the update detection.

Figure 3:
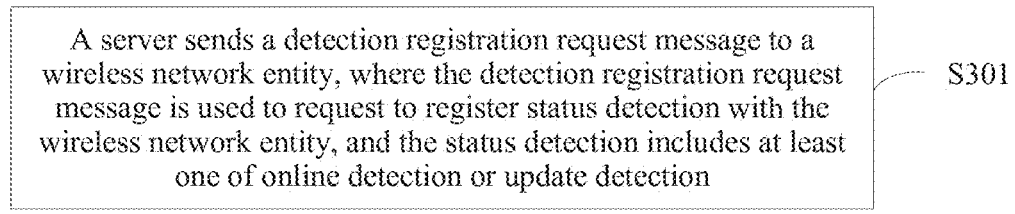
FIG. 3 is a flowchart 3 of a status detection method according to an embodiment.

This embodiment provides a status detection method, where the status detection method relates to a server side. As shown in FIG. 3, the status detection method may include.

S301. A server sends a detection registration request message to a wireless network entity, where the detection registration request message is used to request to register status detection with the wireless network entity, and the status detection includes at least one of online detection or update detection.

After UE is connected to a wireless network, a client in the UE is started and connected to a network-side server corresponding to the client. After the client completes the connection to the server, the server may initiate registration of the status detection to the wireless network entity, that is, the server may send the detection registration request message to the wireless network entity. After completing the registration of the status detection according to the detection registration request message, the wireless network entity performs the status detection. The detection registration request message may be used to request to register the status detection with the wireless network entity, and the status detection may include at least one of the online detection or the update detection.

It should be noted that this embodiment provides a status detection method, where the status detection method may include at least one of an online detection method or an update detection method. The following embodiments separately detail the two status detection methods.

According to the status detection method provided in this embodiment, a wireless network entity receives a detection registration request message sent by UE or a server corresponding to a client in UE, where the detection registration request message is used to request to register status detection with the wireless network entity, and the status detection includes at least one of online detection or update detection; the wireless network entity completes registration of the status detection according to the detection registration request message; and the wireless network entity performs the status detection, and sends a result of the status detection. According to the solutions, after the wireless network entity completes the registration that is of the status detection and initiated by the UE or the server corresponding to the client in the UE, the wireless network entity may perform the status detection, and send the result of the status detection, that is, the wireless network entity may take the place of the UE to perform the status detection. Therefore, compared with a prior-art method in which the UE needs to periodically send a detection packet for status detection, the status detection method provided in this embodiment can change current situations in which the UE frequently establishes an air interface connection to the wireless network entity, and an air interface connection is maintained between the UE and the wireless network entity for a long time.

Embodiment 2

Figure 4:
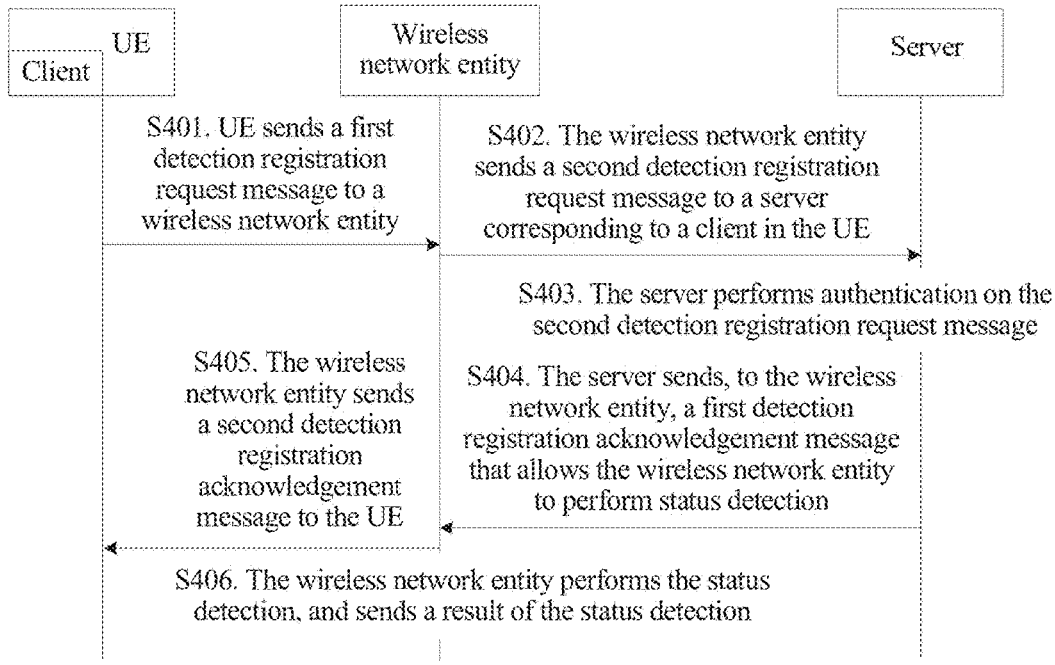
FIG. 4 is an interaction diagram 1 of a status detection method according to an embodiment.

This embodiment provides a status detection method, where a registration process of status detection in the status detection method may be initiated by UE, may be initiated by a server, or may be initiated by a wireless network entity. Specifically, as shown in FIG. 4, when the UE initiates the registration of the status detection, the status detection method provided in this embodiment may include.

S401. The UE sends a first detection registration request message to the wireless network entity, where the first detection registration request message is used to request to register status detection with the wireless network entity.

S402. The wireless network entity sends a second detection registration request message to a server corresponding to a client in the UE.

S403. The server performs authentication on the second detection registration request message.

S404. The server sends, to the wireless network entity, a first detection registration acknowledgement message that allows the wireless network entity to perform the status detection.

S405. The wireless network entity sends a second detection registration acknowledgement message to the UE.

S406. The wireless network entity performs the status detection, and sends a result of the status detection.

Specifically, when the client in the UE needs to register the status detection with the wireless network entity, the client in the UE may trigger the UE to initiate registration of the status detection to the wireless network entity, that is, the UE may send the first detection registration request message to the wireless network entity by using a WCM in the UE. Then, the wireless network entity sends the second detection registration request message to the network-side server corresponding to the client, so that the server can perform authentication on the second detection registration request message. After the authentication performed by the server on the second detection registration request message succeeds, the server may send, to the wireless network entity, the first detection registration acknowledgement message corresponding to the second detection registration request message. Finally, the wireless network entity sends the second detection registration acknowledgement message to the UE, and the UE transmits the second detection registration acknowledgement message to the client. In this way, the wireless network entity completes the registration of the status detection, that is, the client successfully registers the status detection with the wireless network entity. The first detection registration request message may be used to request to register the status detection with the wireless network entity, and the status detection may include at least one of online detection or update detection. When the status detection is the online detection, the first detection registration request message may be a first online-detection registration request message, and the first online-detection registration request message may be used to request to register the online detection with the wireless network entity. Correspondingly, the first detection registration acknowledgement message may be a first online-detection registration acknowledgement message, and the first online-detection registration acknowledgement message may be used to confirm that the server allows the wireless network entity to perform the online detection. When the status detection is the update detection, the first detection registration request message may be a first update-detection registration request message, and the first update-detection registration request message may be used to request to register the update detection with the wireless network entity. Correspondingly, the first detection registration acknowledgement message may be a first update-detection registration acknowledgement message, and the first update-detection registration acknowledgement message may be used to confirm that the server allows the wireless network entity to perform the update detection.

The status detection may include at least one of the online detection or the update detection. Therefore, if the status detection is the online detection, after performing the online detection, the wireless network entity may send a result of the online detection to both the UE and the server corresponding to the client in the UE; and the UE may transmit the result of the online detection to the client after receiving the result of the online detection. If the status detection is the update detection, after performing the update detection, the wireless network entity may send a result of the update detection to the UE; and the UE transmits the result of the update detection to the client.

Further, that the foregoing status detection may include at least one of the online detection or the update detection may be understood as: the status detection may include the online detection; or the status detection may include the update detection; or the status detection may include both the online detection and the update detection.

It should be noted that the UE provided in this embodiment may include a client and a WCM, where the client may be an APP installed on the UE, and the WCM may be a wireless communications module in the UE and is mainly responsible for processing a wireless communications protocol and a wireless communication function that are in the UE. Information exchange between the APP and the wireless network entity and between the APP and the server by using the UE needs to be performed by using the WCM.

The application installed on the UE may obtain, by using the server corresponding to the application, data from an application installed on another UE. Exemplarily, it is assumed that there are two UEs: UE 1 and UE 2 respectively, and an application is installed on each of the UE 1 and the UE 2, when the application in the UE 1 needs to obtain data sent by the application in the UE 2, the application in the UE 1 needs to obtain, from a server corresponding to the application, the data sent by the application in the UE 2.

It may be understood that the client refers to an application that provides a service for a customer and that corresponds to the server. The application may be installed on the UE, and the application requires a service to be provided for the application by a network-side server corresponding to the application. Generally, the application and the server need to be in an online state, to ensure normal interaction between the application and the server.

Particularly, the server provided in this embodiment is a network-side server corresponding to the client in the UE, that is, the server may provide a service for the client.

Further, the foregoing wireless network entity may be an SGSN, a BSC, a BTS, or the like on a GPRS network; or may be an RNC, a NodeB, or the like on a WCDMA network; or may be an MME, an eNodeB, or the like on an LTE core network; or may be a wireless network entity on another wireless network; or may be a wireless network entity on a wireless network that probably appears in the future. The present embodiments set no limitation.

Further, the first detection registration request message may carry an identifier of the client, an identifier of the UE, address information of the server, authentication information of the UE in the server, information that indicates a status detection period suggested by the UE, and the like. The second detection registration request message may carry the identifier of the client, the identifier of the UE, the address information of the server, the authentication information of the UE in the server, information that indicates a status detection period provided by the wireless network entity, and the like. Correspondingly, the first detection registration acknowledgement message and the second detection registration acknowledgement may carry the identifier of the client, the identifier of the UE, information that indicates a status detection period accepted by the server, and the like.

Further, after receiving the first detection registration request message sent by the UE, the wireless network entity may determine, according to the information that indicates the status detection period suggested by the UE and that is carried in the first detection registration request message, the information that indicates the status detection period provided by the wireless network entity. Specifically, if the wireless network entity accepts the status detection period suggested by the UE, the wireless network entity may determine a status detection period, from the status detection period suggested by the UE, as the status detection period provided by the wireless network entity. If the wireless network entity does not accept the status detection period suggested by the UE, the wireless network entity may re-determine a status detection period as the status detection period provided by the wireless network entity.

The status detection period suggested by the UE may be a determined time, for example, 3 seconds. Correspondingly, the status detection period suggested by the UE may alternatively be a time range, for example, 1 second to 8 seconds. Specifically, the status detection period suggested by the UE may be set according to actual usage. The present embodiments set no limitation.

Particularly, after the wireless network entity receives the first detection registration request message sent by the UE, when the wireless network entity sends the second detection registration request message to the server, the second detection registration request message may carry the status detection period provided by the wireless network entity, for selection by the server. The wireless network entity may send the second detection registration request message to the server according to the address information of the server that is carried in the first detection registration request message or the second detection registration request message. The server may perform authentication on the second detection registration request message according to the authentication information that is of the UE in the server and that is carried in the second detection registration request message, so as to verify validity of the second detection registration request message. The wireless network entity may send the second detection registration acknowledgement message to the UE according to the identifier of the client and the identifier of the UE that are carried in the first detection registration acknowledgement message or the second detection registration acknowledgement message, and then the UE transmits the second detection registration acknowledgement message to the client in the UE.

It should be noted that the foregoing status detection period accepted by the server is a status detection period provided by the wireless network entity, where the status detection period provided by the wireless network entity is determined by the server from the information that indicates the status detection period provided by the wireless network entity and that is carried in the second detection registration request message sent by the wireless network entity, and the foregoing status detection period accepted by the server is selected from the status detection period provided by the wireless network entity. The status detection period provided by the wireless network entity may be several status detection periods.

Further, after receiving the first detection registration acknowledgement message sent by the server, the wireless network entity may determine, according to the information that indicates the status detection period accepted by the server and that is carried in the first detection registration acknowledgement message, the status detection period accepted by the server, that is, the wireless network entity may learn a period of performing the status detection by the wireless network entity. That is, the wireless network entity may perform the status detection according to the status detection period accepted by the server. After receiving, by using the WCM in the UE, the second detection registration acknowledgement message sent by the wireless network entity, the UE may determine, according to the information that indicates the status detection period accepted by the server and that is carried in the second detection registration acknowledgement message, the status detection period accepted by the server, that is, the UE may learn a period of performing the status detection by the wireless network entity, and the UE may also learn a period of reporting a protocol message to the wireless network entity by the UE. That is, the UE may periodically report the protocol message to the wireless network entity according to the status detection period accepted by the server.

Further, the protocol message provided in this embodiment refers to a message that is defined in a wireless communications protocol and that is transmitted by using an air interface, for example, L1, L2, and L3 messages defined in the 3GPP protocol, or a PHY (Physical) layer message and a MAC (Media Access Control) layer message that are defined in the 802.11-series protocol. The L1 message defined in the 3GPP protocol refers to a PHY layer message, the L2 message refers to a PDCP (Packet Data Convergence Protocol) layer message, an RLC (Radio Link Control) layer message, and a MAC layer message, and the L3 message refers to an RRC (Radio Resource Control) layer message. Specifically, the protocol message may be a measurement message periodically reported by the UE, a location update request message periodically sent by the UE, or the like.

Figure 5:
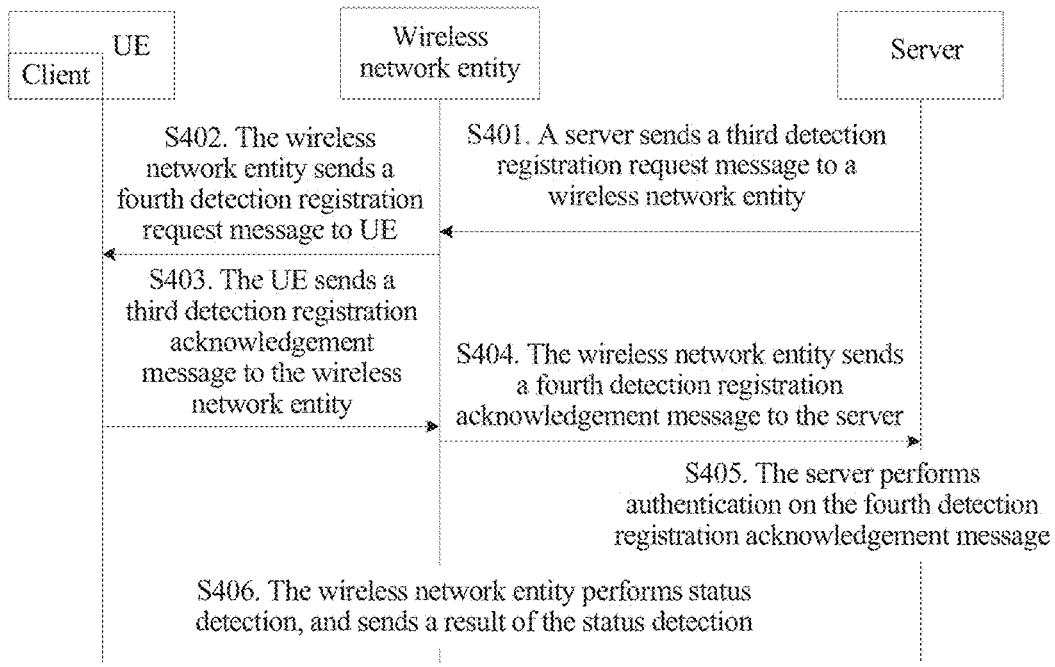
FIG. 5 is an interaction diagram 2 of a status detection method according to an embodiment.

Specifically, as shown in FIG. 5, when the server initiates the registration of the status detection, S401 to S405 shown in FIG. 4 may further be as follows.

S401. The server sends a third detection registration request message to the wireless network entity, where the third detection registration request message is used to request to register status detection with the wireless network entity.

S402. The wireless network entity sends a fourth detection registration request message to the UE.

S403. The UE sends a third detection registration acknowledgement message to the wireless network entity.

S404. The wireless network entity sends a fourth detection registration acknowledgement message to the server.

S405. The server performs authentication on the fourth detection registration acknowledgement message.

Specifically, when the server initiates the registration of the status detection to the wireless network entity, the server may send the third detection registration request message to the wireless network entity, and then, the wireless network entity sends the fourth detection registration request message to the UE. After receiving the fourth detection registration request, the UE transmits the fourth detection registration request to a client that is in the UE and that corresponds to the server. The client may trigger the UE to send, to the wireless network entity, the third detection registration acknowledgement message corresponding to the fourth detection registration request message, and then the wireless network entity sends the fourth detection registration acknowledgement message to the server, so that the server can perform authentication on the fourth detection registration acknowledgement message, and the wireless network entity completes the registration of the status detection. The third detection registration request message is used to request to register the status detection with the wireless network entity, where the third detection registration request message may include at least one of online detection or update detection. When the status detection is the online detection, the third detection registration request message may be a third online-detection registration request message, and the third online-detection registration request message may be used to request to register the online detection with the wireless network entity. Correspondingly, the third detection registration acknowledgement message may be a third online-detection registration acknowledgement message. When the status detection is the update detection, the third detection registration request message may be a third update-detection registration request message, and the third update-detection registration request message may be used to request to register the update detection with the wireless network entity. Correspondingly, the third detection registration acknowledgement message may be a third update-detection registration acknowledgement message.

Further, the third detection registration request message may carry an identifier of the client, an identifier of the UE, address information of the server, information that indicates a status detection period provided by the server, and the like. The fourth detection registration request message may carry the identifier of the client, the identifier of the UE, the address information of the server, information that indicates a status detection period accepted by the wireless network entity, and the like. Correspondingly, the third detection registration acknowledgement message may carry the address information of the server, and authentication information of the UE in the server, and the like; the fourth detection registration acknowledgement message may carry the address information of the server, and the authentication information of the UE in the server, and the like.

The wireless network entity may send, according to the identifier of the UE that is carried in the third detection registration request message or the fourth detection registration request message, the fourth detection registration request message to the UE corresponding to the identifier of the UE, and then the UE sends, according to the identifier of the client that is carried in the fourth detection registration request message, the fourth detection registration request message to the client that is in the UE and that corresponds to the identifier of the client. The wireless network entity may send, according to the address information of the server that is carried in the third detection registration acknowledgement message or the fourth detection registration acknowledgement message, the fourth detection registration acknowledgement message to the server corresponding to the address information of the server. The server may perform authentication on the fourth detection registration request message according to the authentication information that is of the UE in the server and that is carried in the fourth detection registration acknowledgement message, so as to verify validity of the fourth detection registration request message.

It should be noted that, after receiving the third detection registration request message sent by the server, the wireless network entity may determine, according to the information that indicates the status detection period provided by the server and that is carried in the third detection registration request message, the information that indicates the status detection period accepted by the wireless network entity. Specifically, after receiving the third detection registration request message sent by the server, the wireless network entity may determine, from the information that indicates the status detection period provided by the server and that is carried in the third detection registration request message, the status detection period provided by the server, and select a status detection period, from the status detection period provided by the server, as the status detection period accepted by the wireless network entity. The status detection period that is provided by the server and that is carried in the third detection registration request message sent by the server may be several status detection periods, that is, the status detection period provided by the server may be several determined times or several time ranges.

Specifically, after receiving the third detection registration request message sent by the server, the wireless network entity may send the fourth detection registration request message to the UE. The information that indicates the status detection period accepted by the wireless network entity and that is carried in the fourth detection registration request message sent by the wireless network entity to the UE is determined by the wireless network entity from the information that indicates the status detection period provided by the server and that is carried in the third detection registration request message sent by the server, and the status detection period accepted by the wireless network entity is selected from the status detection period provided by the server, so that the wireless network entity can determine a period of performing the status detection by the wireless network entity, that is, the wireless network entity may perform the status detection according to the status detection period accepted by the wireless network entity.

After receiving, by using the WCM in the UE, the fourth detection registration request message sent by the wireless network entity, the UE may determine, according to the information that indicates the status detection period accepted by the wireless network entity and that is carried in the fourth detection registration request message, the status detection period accepted by the wireless network entity, that is, the UE may learn a period of reporting a protocol message by the UE. That is, the UE may report the protocol message to the wireless network entity according to the status detection period accepted by the wireless network entity.

Figure 6:
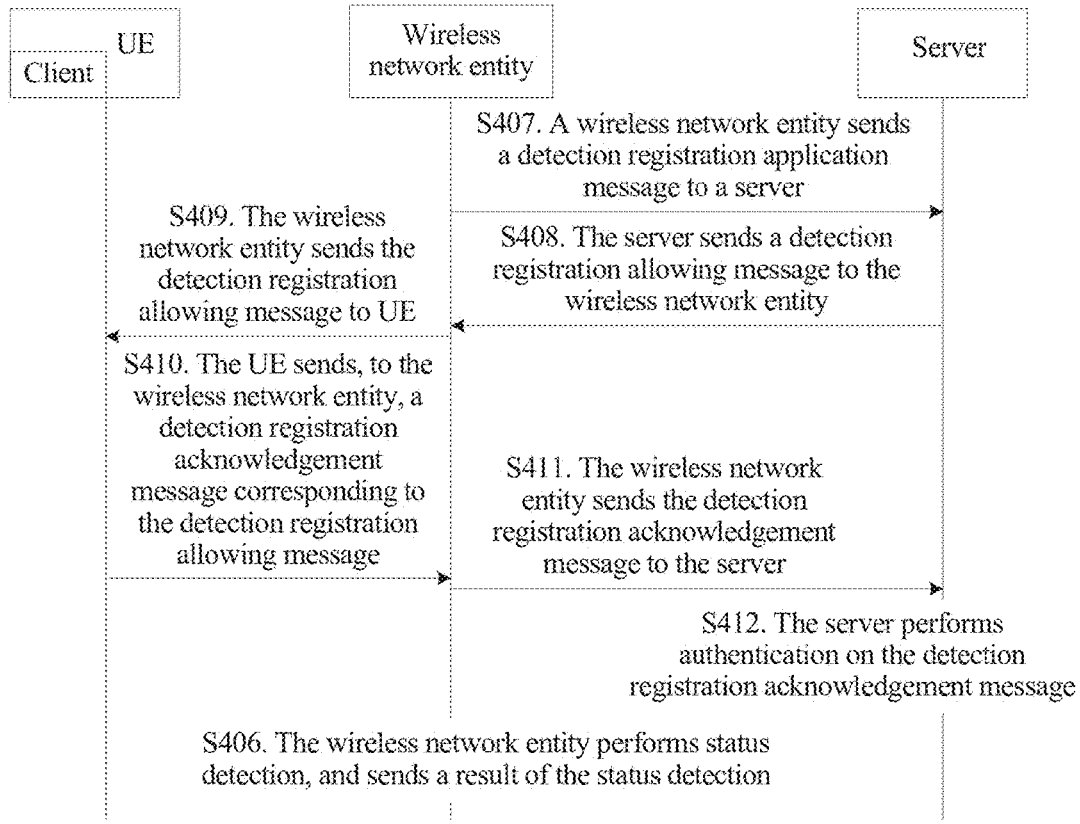
FIG. 6 is an interaction diagram 3 of a status detection method according to an embodiment.

Specifically, as shown in FIG. 6, when the wireless network entity initiates the registration of the status detection, S401 to S405 shown in the foregoing FIG. 5 may further be the following S407 to S412.

S407. The wireless network entity sends a detection registration application message to the server, where the detection registration application message is used for the wireless network entity to apply to the server for registration that is of status detection and that is to be performed by the wireless network entity.

S408. The server sends a detection registration allowing message to the wireless network entity, where the detection registration allowing message is used to allow the wireless network entity to perform the registration of the status detection.

S409. The wireless network entity sends the detection registration allowing message to the UE.

S410. The UE sends, to the wireless network entity, a detection registration acknowledgement message corresponding to the detection registration allowing message.

S411. The wireless network entity sends the detection registration acknowledgement message to the server.

S412. The server performs authentication on the detection registration acknowledgement message.

Specifically, when the wireless network entity initiates the registration of the status detection, the wireless network entity may send the detection registration application message to the server, the server sends, to the wireless network entity, the detection registration allowing message corresponding to the detection registration application message, and the wireless network entity sends the detection registration allowing message to the UE. Then, the UE transmits the detection registration allowing message to a client that is in the UE and that corresponds to the server, the client triggers the UE to send, to the wireless network entity, the detection registration acknowledgement message corresponding to the detection registration allowing message, and then the wireless network entity sends the detection registration acknowledgement message to the server, so that the server can perform authentication on the detection registration acknowledgement message, and the wireless network entity completes the registration of the status detection. The detection registration application message may be used for the wireless network entity to apply to the server for the registration that is of the status detection and that is to be performed by the wireless network entity, where the status detection may include at least one of online detection or update detection. When the status detection is the online detection, the detection registration application message may be an online-detection registration application message, and the online-detection registration application message may be used for the wireless network entity to apply to the server for registration that is of the online detection and that is to be performed by the wireless network entity. Correspondingly, the detection registration allowing message may be an online-detection registration allowing message, and the online-detection registration allowing message may be used to allow the wireless network entity to perform the registration of the online detection. When the status detection is the update detection, the detection registration application message may be an update-detection registration application message, and the update-detection registration application message may be used for the wireless network entity to apply to the server for registration that is of the update detection and that is to be performed by the wireless network entity. Correspondingly, the detection registration allowing message may be an update-detection registration allowing message, and the update-detection registration allowing message may be used to allow the wireless network entity to perform the registration of the update detection. The detection registration acknowledgement message may be an update-detection registration acknowledgement message.

Further, the detection registration application message may carry an identifier of the client, an identifier of the UE, address information of the server, a status detection period provided by the wireless network entity, and the like. Correspondingly, the detection registration allowing message may carry the identifier of the client, the identifier of the UE, the address information of the server, and a status detection period accepted by the server. The detection registration acknowledgement message may carry the address information of the server, authentication information of the UE in the server, and the like.

The wireless network entity may send, according to the address information of the server that is carried in the detection registration application message, the detection registration application message to the server corresponding to the address information of the server. The wireless network entity may send, according to the identifier of the UE that is carried in the detection registration allowing message, the detection registration allowing message to the UE corresponding to the identifier of the UE, and then the UE sends, according to the identifier of the client that is carried in the detection registration allowing message, the detection registration allowing message to the client that is in the UE and that corresponds to the identifier of the client. The server may perform authentication on the detection registration acknowledgement message according to the authentication information that is of the UE in the server and that is carried in the detection registration acknowledgement message, so as to verify validity of the detection registration acknowledgement message.

It should be noted that, after receiving the detection registration application message sent by the wireless network entity, the server may select a status detection period from the status detection period that is provided by the wireless network entity and that is carried in the detection registration application message, add the status detection period that is used as the status detection period accepted by the server to the detection registration allowing message, and send the detection registration allowing message to the wireless network entity. The status detection period that is provided by the wireless network entity and that is carried in the detection registration application message sent by the wireless network entity may be several status detection periods, that is, the status detection period provided by the wireless network entity may be several determined times or several time ranges.

Specifically, after receiving the detection registration application message sent by the wireless network entity, the server may send, to the wireless network entity, the detection registration allowing message corresponding to the detection registration application message, where the status detection period that is accepted by the server and that is carried in the detection registration allowing message is a status detection period selected by the server from the status detection period that is provided by the wireless network entity and that is carried in the detection registration application message sent by the wireless network entity, so that the wireless network entity can determine a period of performing the status detection by the wireless network entity, that is, the wireless network entity may perform the status detection according to the status detection period.

After receiving the detection registration allowing message sent by the wireless network entity, the UE may learn, according to the status detection period that is accepted by the server and that is carried in the detection registration allowing message, a period of reporting a protocol message by the UE. That is, the UE may report, by using the WCM in the UE, the protocol message to the wireless network entity according to the status detection period accepted by the server.

Figure 7:
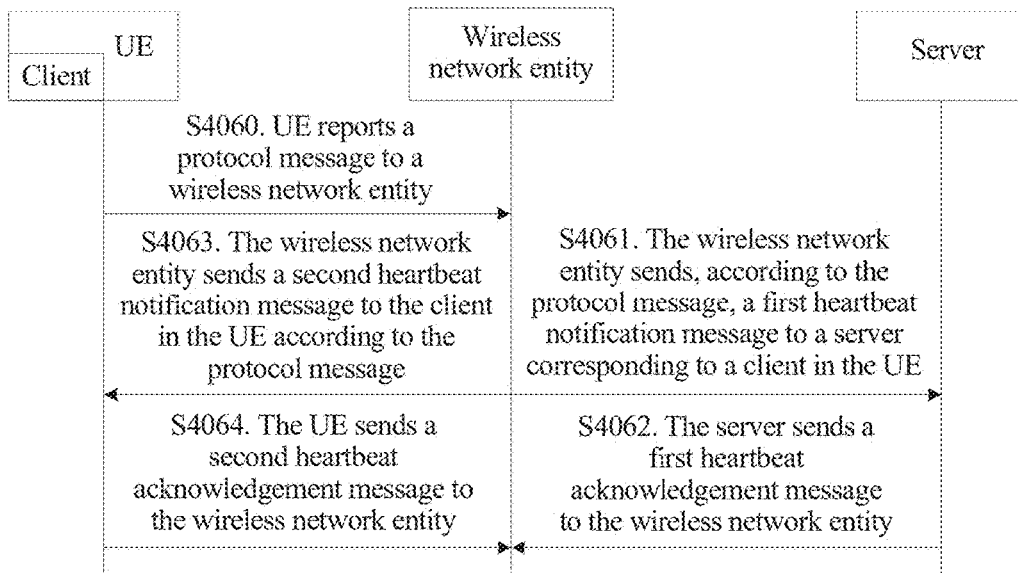
FIG. 7 is an interaction diagram 4 of a status detection method according to an embodiment.

Further, if the status detection shown in FIG. 4, FIG. 5, and FIG. 6 is the online detection, as shown in FIG. 7, S406 in FIG. 4, FIG. 5, and FIG. 6 may specifically include.

S4060. The UE reports a protocol message to the wireless network entity.

S4061. The wireless network entity sends, according to the protocol message, a first heartbeat notification message to the server corresponding to the client in the UE.

S4062. The server sends a first heartbeat acknowledgement message to the wireless network entity.

S4063. The wireless network entity sends a second heartbeat notification message to the client in the UE according to the protocol message.

S4064. The UE sends a second heartbeat acknowledgement message to the wireless network entity.

This embodiment sets no limitation to an execution sequence of S4061 to S4062 and S4063 to S4064, that is, S4061 to S4062 may be executed before S4063 to S4064 are executed, or S4063 to S4064 may be executed before S4061 to S4062 are executed, or S4061 to S4062 and S4063 to S4064 may be executed at the same time.

After the UE is connected to a wireless network and successfully registers the online detection with the wireless network entity, the UE may periodically report the protocol message to the wireless network entity, so that the wireless network entity can determine, according to whether the protocol message reported by the UE is obtained, whether the client in the UE is in an online state. In addition, after determining that the client is in an online state, the wireless network entity may notify a network-side server corresponding to the client that the client is in an online state, and notify the UE that the server is in an online state. Then, the UE notifies the client that the server is in an online state, that is, the wireless network entity may take the place of the client to perform the online detection. The protocol message may be a message exchanged by the UE with the wireless network entity by using a protocol.

Specifically, after obtaining the protocol message reported by the UE, the wireless network entity may send, according to the protocol message, the first heartbeat notification message corresponding to the protocol message to the network-side server corresponding to the client in the UE. Correspondingly, the server sends, to the wireless network entity, the first heartbeat acknowledgement message corresponding to the first heartbeat notification message. In addition, the wireless network entity sends, to the UE, the second heartbeat notification message corresponding to the protocol message, the UE transmits the second heartbeat notification message to the client, and the client triggers the UE to send, to the wireless network entity, the second heartbeat acknowledgement message corresponding to the second heartbeat notification message. The first heartbeat notification message may indicate that the client is in an online state and may be specifically used to notify the server that the client is in an online state, that is, the client may receive instant data sent by the server. The first heartbeat acknowledgement message may indicate that the server successfully receives the first heartbeat notification message. The second heartbeat notification message may indicate that the server is in an online state and may be specifically used to notify the client that the server is in an online state, that is, the server may receive instant data sent by the client. The second heartbeat acknowledgement message may indicate that the client successfully receives the second heartbeat notification message.

It should be noted that a heartbeat notification message sent by the wireless network entity to the UE, that is, the heartbeat notification message sent by the wireless network entity and received by the UE, is the foregoing second heartbeat notification message. Correspondingly, a heartbeat acknowledgement message sent by the UE and received by the wireless network entity is the foregoing second heartbeat acknowledgement message.

Further, the protocol message may be a measurement message periodically reported by the UE, a location update request message periodically sent by the UE, or the like. After the UE is connected to the wireless network, when the UE is in an online state, the protocol message reported by the UE is the measurement message of the UE. After the UE is connected to the wireless network, when the UE is in an idle state, the UE performs location update, and in this case, the protocol message reported by the UE is the location update request message of the UE.

Particularly, the UE may periodically report the protocol message to the wireless network entity according to an online detection period of performing the online detection by the wireless network entity. The online detection period is determined during a process in which registration of the online detection is performed between the UE, the wireless network entity, and the server. For a specific process of determining the online detection period, reference may be made to related descriptions in the foregoing embodiments, and details are not described herein again.

It may be understood that, in this embodiment, because the server is a device on the network side, the wireless network entity may consider that the server is always in an online state. The wireless network entity provided in this embodiment mainly detects whether the client in the UE is online.

According to the online detection method provided in this embodiment, after a wireless network entity completes registration of online detection, the wireless network entity may learn, according to whether a protocol message periodically reported by UE is received, whether the UE is in an online state. If the wireless network entity receives the protocol message reported by the UE, the wireless network entity may consider that a client in the UE is also in an online state. In this case, the wireless network entity may send a first heartbeat notification message to a server corresponding to the client in the UE, and send a second heartbeat notification message to the client in the UE, so as to complete the online detection between the client in the UE and the server. Compared with the prior art, in the online detection method, the wireless network entity directly determines, according to whether the protocol message reported by the UE is received, whether the client in the UE is in an online state, and the UE and the server do not need to send a detection packet to each other for detection. Therefore, an air interface resource can be saved, and power consumption of the UE can be reduced, where the air interface resource is wasted in the prior art when the UE sends a detection packet to the wireless network entity during online detection performed between the UE and the server.

Figure 8:
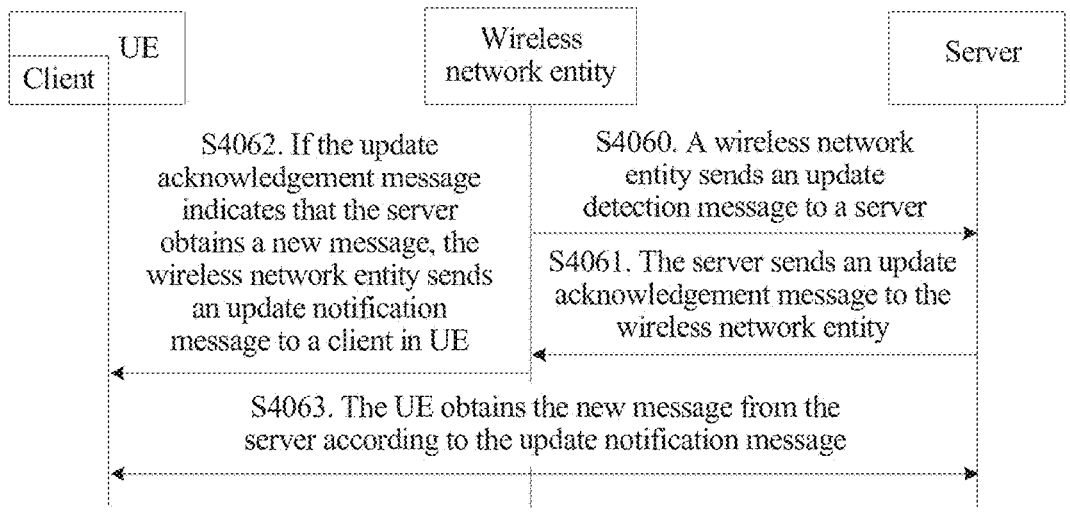
FIG. 8 is an interaction diagram 5 of a status detection method according to an embodiment.

Further, if the status detection shown in FIG. 4, FIG. 5, and FIG. 6 is the update detection, as shown in FIG. 8, S406 in FIG. 4, FIG. 5, and FIG. 6 may specifically include.

S4060. The wireless network entity sends an update detection message to the server.

S4061. The server sends an update acknowledgement message to the wireless network entity.

S4062. If the update acknowledgement message indicates that the server obtains a new message, the wireless network entity sends an update notification message to the client in the UE.

S4063. The UE obtains the new message from the server according to the update notification message.

After the UE is connected to a wireless network and successfully registers the update detection with the wireless network entity, the wireless network entity may send the update detection message to the server. That is, after receiving the update detection message sent by the wireless network entity, the server sends, to the wireless network entity, the update acknowledgement message corresponding to the update detection message. If the update acknowledgement message indicates that the server obtains the new message, the wireless network entity sends the update notification message to the UE, and then the UE transmits the update notification message to the client in the UE. After receiving the update notification message, the client may obtain the new message from the server according to the update notification message.

Specifically, the update detection message may be used to detect whether the server obtains the new message. The update detection acknowledgement message is used to indicate whether the server obtains the new message. The update notification message indicates that the server obtains the new message, and instructs the client to obtain the new message from the server, that is, the update notification message is specifically used to: notify the client in the UE that the server obtains the new message, and instruct the client to obtain the new message from the server.

Particularly, the wireless network entity may periodically send the update detection message to the server according to an update detection period of performing the update detection by the wireless network entity. The update detection period is determined by the server during a process in which registration of the update detection is performed between the UE, the wireless network entity, and the server. For a specific process of determining the update detection period, reference may be made to related descriptions in the foregoing embodiments, and details are not described herein again.

According to the update detection method provided in this embodiment, after a wireless network entity completes registration of update detection, the wireless network entity may take the place of UE to periodically send an update detection message to a server, to detect whether the server obtains a new message, that is, whether content in the server is updated. When the wireless network entity detects that the content in the server is updated, the wireless network entity may send an update notification message to a client in the UE, to instruct the client to obtain the new message from the server. Compared with the prior art, in the update detection method, the wireless network entity directly sends the update detection message to the server for detection, and the UE and the server do not need to send a detection packet to each other for detection. Therefore, an air interface resource can be saved, and power consumption of the UE can be reduced, where the air interface resource is wasted in the prior art when the UE sends a detection packet to the wireless network entity during update detection performed between the UE and the server.

According to the status detection method provided in this embodiment, a wireless network entity receives a detection registration request message sent by UE or a server corresponding to a client in UE, where the detection registration request message is used to request to register status detection with the wireless network entity, and the status detection includes at least one of online detection or update detection; the wireless network entity completes registration of the status detection according to the detection registration request message; and the wireless network entity performs the status detection, and sends a result of the status detection. According to the solutions, after the wireless network entity completes the registration that is of the status detection and initiated by the UE or the server corresponding to the client in the UE, the wireless network entity may perform the status detection, and send the result of the status detection, that is, the wireless network entity may take the place of the UE to perform the status detection. Therefore, compared with a prior-art method in which the UE needs to periodically send a detection packet for status detection, the status detection method provided in this embodiment can change current situations in which the UE frequently establishes an air interface connection to the wireless network entity, and an air interface connection is maintained between the UE and the wireless network entity for a long time.

Embodiment 3

Figure 9:
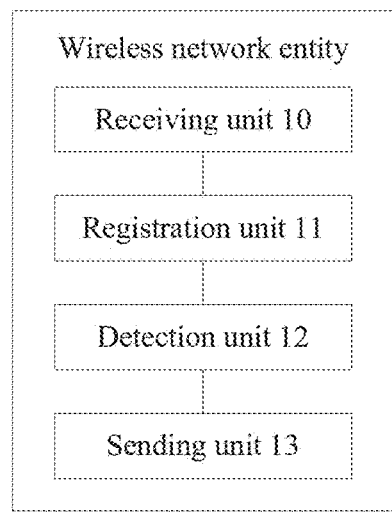
FIG. 9 is a schematic structural diagram 1 of a wireless network entity according to an embodiment.

As shown in FIG. 9, this embodiment provides a wireless network entity, where the wireless network entity may include: a receiving unit 10, configured to receive a detection registration request message sent by UE or a server corresponding to a client in the UE, where the detection registration request message is used to request to register status detection with the wireless network entity, and the status detection includes at least one of online detection or update detection; a registration unit 11, configured to complete registration of the status detection according to the detection registration request message received by the receiving unit 10; a detection unit 12, configured to perform the status detection after the registration unit 11 completes the registration of the status detection; and a sending unit 13, configured to send a result of the status detection performed by the detection unit 12.

Figure 10:
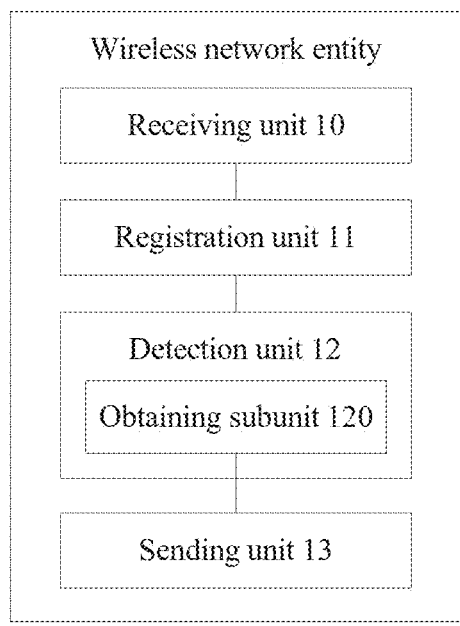
FIG. 10 is a schematic structural diagram 2 of a wireless network entity according to an embodiment.

Optionally, the status detection is the online detection. As shown in FIG. 10, the detection unit 12 specifically includes an obtaining subunit 120, where the obtaining subunit 120 is configured to obtain a protocol message reported by the UE; and the sending unit 13 is specifically configured to: according to the protocol message obtained by the obtaining subunit 120, send a first heartbeat notification message to the server, and send a second heartbeat notification message to the client, where the first heartbeat notification message indicates that the client is in an online state, and the second heartbeat notification message indicates that the server is in an online state.

Figure 11:
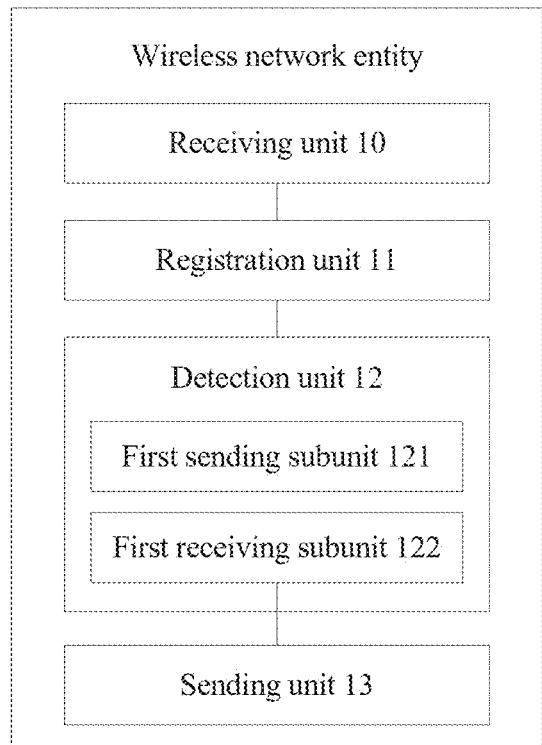
FIG. 11 is a schematic structural diagram 3 of a wireless network entity according to an embodiment.

Optionally, the status detection is the update detection. As shown in FIG. 11, the detection unit 12 specifically includes a first sending subunit 121 and a first receiving subunit 122, where the first sending subunit 121 is configured to send an update detection message to the server; the first receiving subunit 122 is configured to receive an update acknowledgement message sent by the server; and the sending unit 13 is specifically configured to send an update notification message to the client if the update acknowledgement message received by the first receiving subunit 122 indicates that the server obtains the new message, where the update notification message indicates that the server obtains the new message, and instructs the client to obtain the new message from the server.

Figure 12:
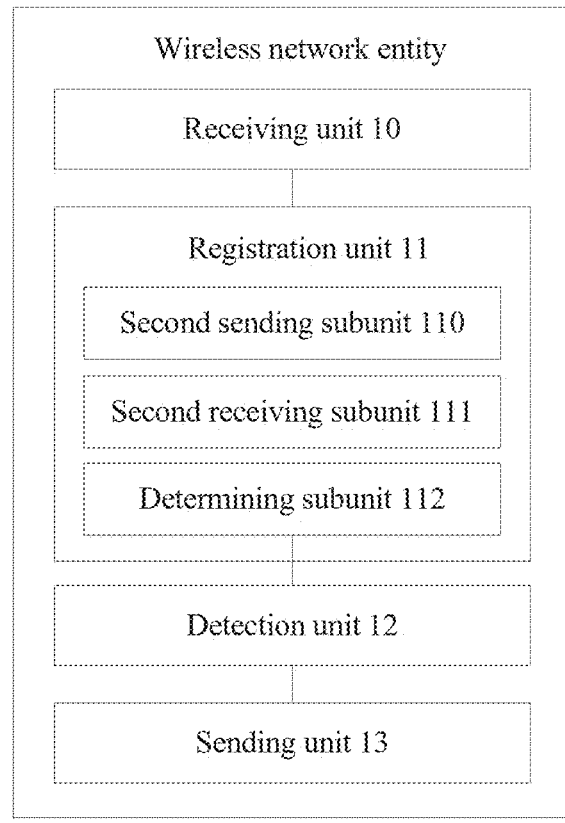
FIG. 12 is a schematic structural diagram 4 of a wireless network entity according to an embodiment.

Optionally, as shown in FIG. 12, the registration unit 11 specifically includes a second sending subunit 110, a second receiving subunit 111, and a determining subunit 112, where the receiving unit 10 is specifically configured to receive a first detection registration request message sent by the UE, where the first detection registration request message carries information that indicates a status detection period suggested by the UE; the determining subunit 112 is configured to determine, according to the information that indicates the status detection period suggested by the UE, information that indicates a status detection period provided by the wireless network entity; and the second sending subunit 110 is configured to send a second detection registration request message to the server, where the second detection registration request message carries the information that indicates the status detection period provided by the wireless network entity; the second receiving subunit 111 is configured to receive a first detection registration acknowledgement message that allows the wireless network entity to perform the status detection and that is sent by the server, where the first detection registration acknowledgement message carries information that indicates a status detection period accepted by the server; and the second sending subunit 110 is further configured to send a second detection registration acknowledgement message to the UE, where the second detection registration acknowledgement message carries the information that indicates the status detection period accepted by the server.

Optionally, as shown in FIG. 12, the registration unit 11 specifically includes the second sending subunit 110, the second receiving subunit 111, and the determining subunit 112, where the receiving unit 10 is specifically configured to receive a third detection registration request message sent by the server, where the third detection registration request message carries information that indicates a status detection period provided by the server; the determining subunit 112 is configured to determine, according to the information that indicates the status detection period provided by the server, information that indicates a status detection period accepted by the wireless network entity; and the second sending subunit 110 is configured to send a fourth detection registration request message to the UE, where the fourth detection registration request message carries the information that indicates the status detection period accepted by the wireless network entity; the second receiving subunit 111 is configured to receive a third detection registration acknowledgement message sent by the UE; and the second sending subunit 110 is further configured to send a fourth detection registration acknowledgement message to the server.

Optionally, the receiving unit 10 is further configured to receive a first heartbeat acknowledgement message sent by the server and a second heartbeat acknowledgement message sent by the UE, where the first heartbeat acknowledgement message indicates that the server successfully receives the first heartbeat notification message, and the second heartbeat acknowledgement message indicates that the UE successfully receives the second heartbeat notification message.

Figure 13:
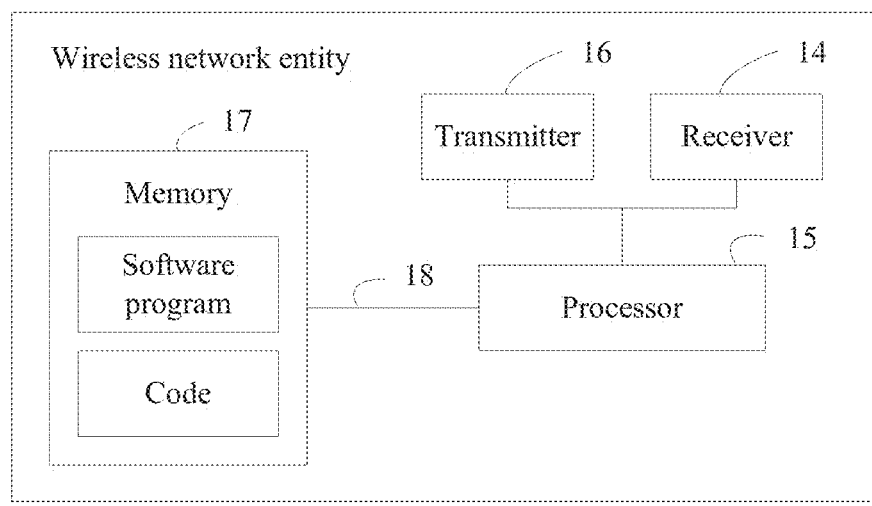
FIG. 13 is a schematic structural diagram 5 of a wireless network entity according to an embodiment.

It should be noted that, as shown in FIG. 13, the foregoing receiving unit 10 may be specifically a receiver 14 disposed in a wireless network entity. The foregoing registration unit 11 and detection unit 12 may be a processor 15 independently disposed in the wireless network entity, or may be integrated and implemented in a processor 15 in the wireless network entity. The processor 15 may be a central processing unit (CPU), or an application-specific integrated circuit (ASIC), or configured as one or more integrated circuits that implement this embodiment. The foregoing sending unit 13 may be specifically a transmitter 16 disposed in the wireless network entity. A memory 17 may be further disposed in the wireless network entity, where the memory 17 may be configured to store a software program that needs to be executed when the processor 15 executes the status detection method provided in the embodiments, and code of various messages that are required when the receiver 14 and the transmitter 16 execute the method, so that the processor 15 completes, by executing these software programs and by invoking the code, the status detection method provided in the embodiments. The wireless network entity may further include a system bus 18, and the receiver 14, the processor 15, the transmitter 16, and the memory 17 are connected and complete communication with each other by using the system bus 18. The receiver 14 and the transmitter 16 may be a communications interface. The receiver 14, the processor 15, and the transmitter 16 may complete, by executing a method procedure shown in FIG. 1 or any one of FIG. 4 to FIG. 8, the status detection method provided in the embodiments.

The wireless network entity provided in this embodiment may be an SGSN, a BSC, a BTS, or the like on a GPRS network; or may be an RNC, a NodeB, or the like on a WCDMA network; or may be an MME, an eNodeB, or the like on an LTE core network; or may be a wireless network entity on another wireless network; or may be a wireless network entity on a wireless network that probably appears in the future. The present embodiments set no limitation.

This embodiment provides a wireless network entity. After completing registration that is of status detection and initiated by UE or a server corresponding to a client in the UE, the wireless network entity may perform the status detection, and send a result of the status detection, that is, the wireless network entity may take the place of the UE to perform the status detection. Therefore, compared with a prior-art method in which the UE needs to periodically send a detection packet for status detection, the wireless network entity provided in this embodiment can change, by performing the status detection, current situations in which the UE frequently establishes an air interface connection to the wireless network entity, and an air interface connection is maintained between the UE and the wireless network entity for a long time.

Figure 14:
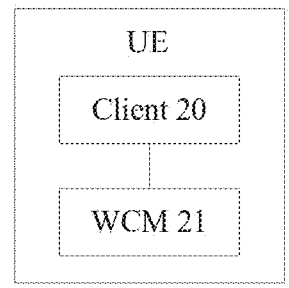
FIG. 14 is a schematic structural diagram 1 of UE according to an embodiment.

As shown in FIG. 14, this embodiment provides UE, where the UE may include a client 20 and a WCM 21, the client 20 runs on the UE, and the WCM 21 provides a radio interface for the client 20, where the WCM 21 is configured to: send, to a wireless network entity, a detection registration request message triggered by the client 20, and receive a result of status detection that is sent by the wireless network entity, where the detection registration request message is used to request to register the status detection with the wireless network entity, and the status detection includes at least one of online detection or update detection.

Optionally, the status detection is the online detection, and the WCM 21 is further configured to report a protocol message to the wireless network entity before receiving the result of the status detection that is sent by the wireless network entity; and the WCM 21 is specifically configured to: receive a heartbeat notification message sent by the wireless network entity, and send the heartbeat notification message to the client 20, where the heartbeat notification message indicates that a server corresponding to the client 20 is in an online state.

Optionally, the status detection is the update detection, and the WCM 21 is specifically configured to: receive an update notification message sent by the wireless network entity, and send the update notification message to the client 20, where the update notification message indicates that the server corresponding to the client 20 obtains a new message; and the client 20 is configured to obtain the new message from the server according to the update notification message after receiving the update notification message sent by the WCM 21.

Optionally, the detection registration request message sent by the WCM 21 carries information that indicates a status detection period suggested by the UE; and the WCM 21 is further configured to: after sending the detection registration request message to the wireless network entity, receive a detection registration acknowledgement message sent by the wireless network entity, and send the detection registration acknowledgement message to the client 20, where the detection registration acknowledgement message carries information that indicates a status detection period accepted by the server.

Optionally, the client 20 is further configured to send a heartbeat acknowledgement message to the WCM 21 after receiving the heartbeat notification message sent by the WCM 21, where the heartbeat acknowledgement message indicates that the client 20 successfully receives the heartbeat notification message; and the WCM 21 is further configured to send the heartbeat acknowledgement message to the wireless network entity.

Figure 15:
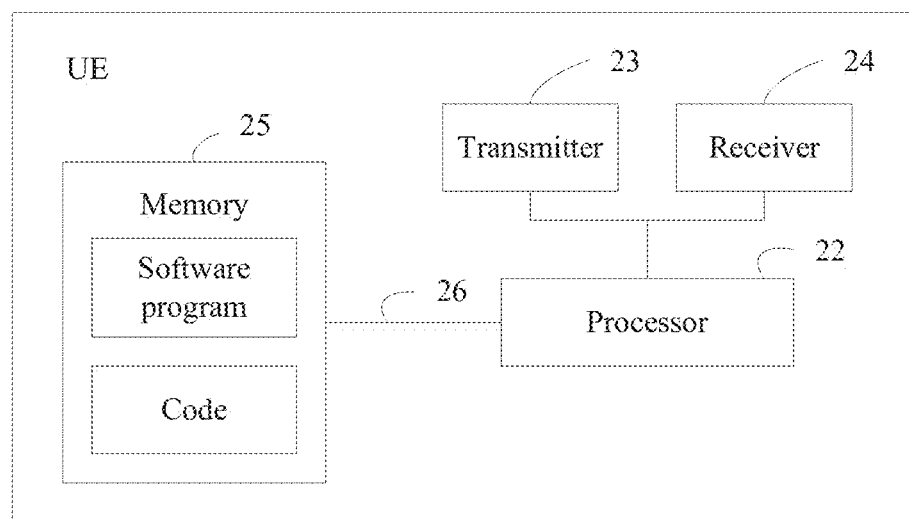
FIG. 15 is a schematic structural diagram 2 of UE according to an embodiment.

It should be noted that, as shown in FIG. 15, the foregoing WCM 21 may be specifically a wireless communications module disposed in UE. The UE may specifically include a processor 22, a transmitter 23, a receiver 24, a memory 25, and a system bus 26. The transmitter 23 and the receiver 24 may be the wireless communications module, and the processor 22 may exchange with the wireless network entity by using the transmitter 23 and the receiver 24. The foregoing client 20 may be a software program running on the processor 22. The processor 22 may be a processor independently disposed in the UE, or may be integrated and implemented in a processor. The processor 22 may be a CPU, or an ASIC, or configured as one or more integrated circuits that implement this embodiment. The memory 25 may be configured to store a software program that needs to be executed when the processor 22 executes the status detection method provided in the embodiments, and code of various messages that are required when the transmitter 23 and the receiver 24 execute the method, so that the processor 22 completes, by executing these software programs and by invoking the code, the status detection method provided in the embodiments. The processor 22, the transmitter 23, the receiver 24, and the memory 25 are connected and complete communication with each other by using the system bus 26. The transmitter 23 and the receiver 24 may be a communications interface. The processor 22, the transmitter 23, and the receiver 24 may complete, by executing a method procedure shown in FIG. 2 or any one of FIG. 4 to FIG. 8, the status detection method provided in the embodiments.

This embodiment provides UE. After the UE initiates registration of status detection to a wireless network entity, and the registration of the status detection is completed, the wireless network entity may take the place of the UE to perform the status detection, and the UE receives a result of the status detection performed by the wireless network entity. Therefore, compared with a prior-art method in which the UE needs to periodically send a detection packet for status detection, the wireless network entity provided in this embodiment can change, by performing the status detection, current situations in which the UE frequently establishes an air interface connection to the wireless network entity, and an air interface connection is maintained between the UE and the wireless network entity for a long time.

Figure 16:
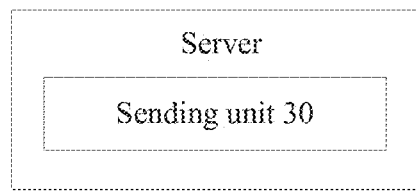
FIG. 16 is a schematic structural diagram 1 of a server according to an embodiment.

As shown in FIG. 16, this embodiment provides a server, where the server may include: a sending unit 30, configured to send a detection registration request message to a wireless network entity, where the detection registration request message is used to request to register status detection with the wireless network entity, and the status detection includes at least one of online detection or update detection.

Figure 17:
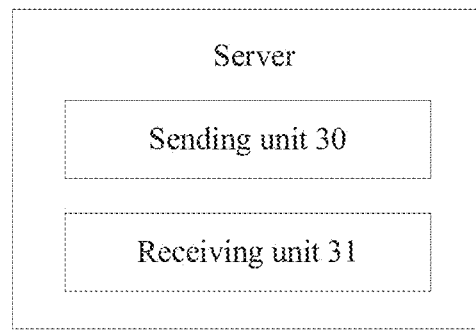
FIG. 17 is a schematic structural diagram 2 of a server according to an embodiment.

Optionally, the status detection is the online detection, as shown in FIG. 17, the server may further include a receiving unit 31, where the receiving unit 31 is configured to receive a result of the online detection that is sent by the wireless network entity.

Optionally, the receiving unit 31 is specifically configured to receive a first heartbeat notification message sent by the wireless network entity, where the first heartbeat notification message indicates that a client that is in user equipment UE and that corresponds to the server is in an online state.

Figure 18:
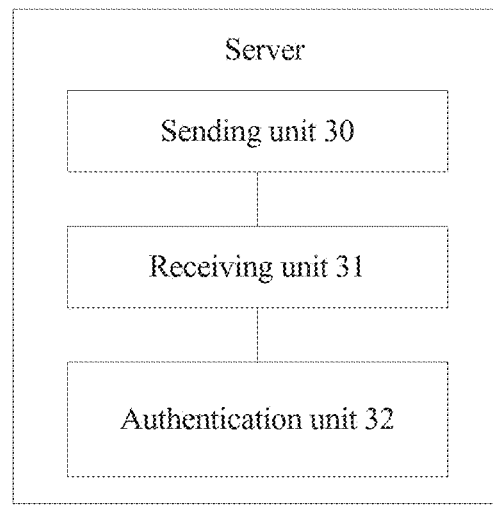
FIG. 18 is a schematic structural diagram 3 of a server according to an embodiment.

Optionally, as shown in FIG. 18, the server further includes an authentication unit 32, where the receiving unit 31 is further configured to: after the sending unit 30 sends the detection registration request message to the wireless network entity, receive a detection registration acknowledgement message sent by the wireless network entity; and the authentication unit 32 is configured to perform authentication on the detection registration acknowledgement message received by the receiving unit 31, so as to complete the registration of the status detection.

Optionally, the sending unit 30 is further configured to send a first heartbeat acknowledgement message to the wireless network entity after the receiving unit 31 receives the first heartbeat notification message sent by the wireless network entity, where the first heartbeat acknowledgement message indicates that the receiving unit successfully receives the first heartbeat notification message.

Figure 19:
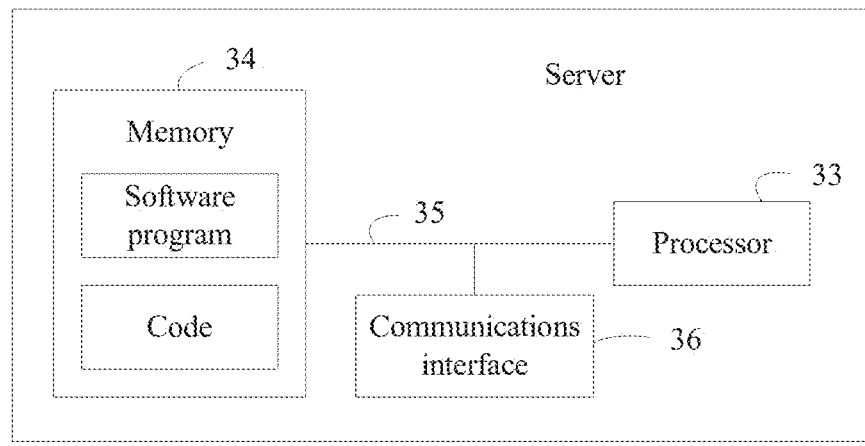
FIG. 19 is a schematic structural diagram 4 of a server according to an embodiment.

It should be noted that, as shown in FIG. 19, the foregoing sending unit 30, receiving unit 31, and authentication unit 32 may be specifically a processor 33 independently disposed in a server, or may be integrated and implemented in a processor 33 in a server. The processor 33 may be a CPU, or an ASIC, or configured as one or more integrated circuits that implement this embodiment. A memory 34 may be further disposed in the server, where the memory 34 may be configured to store a software program that needs to be executed and code of various messages that are required when the processor 33 executes the status detection method provided in the embodiments, so that the processor 33 completes, by executing these software programs and by invoking the code, the status detection method provided in the embodiments. The server may further include a system bus 35 and a communications interface 36. The processor 33, the memory 34, and the communications interface 36 are connected and complete communication with each other by using the system bus 35. The processor 33 may interact with another device by using the communications interface 36. The processor 33 may complete, by executing a method procedure shown in any one of FIG. 3 to FIG. 8, the status detection method provided in the embodiments.

This embodiment provides a server. After the server initiates registration of status detection to a wireless network entity, and the registration of the status detection is completed, the wireless network entity may take the place of the server to perform the status detection, and the UE receives a result of the status detection performed by the wireless network entity. Therefore, compared with a prior-art method in which the server needs to periodically send a detection packet for status detection, the wireless network entity provided in this embodiment can change, by performing the status detection, current situations in which the UE frequently establishes an air interface connection to the wireless network entity, and an air interface connection is maintained between the UE and the wireless network entity for a long time.

Embodiment 4

Figure 20:
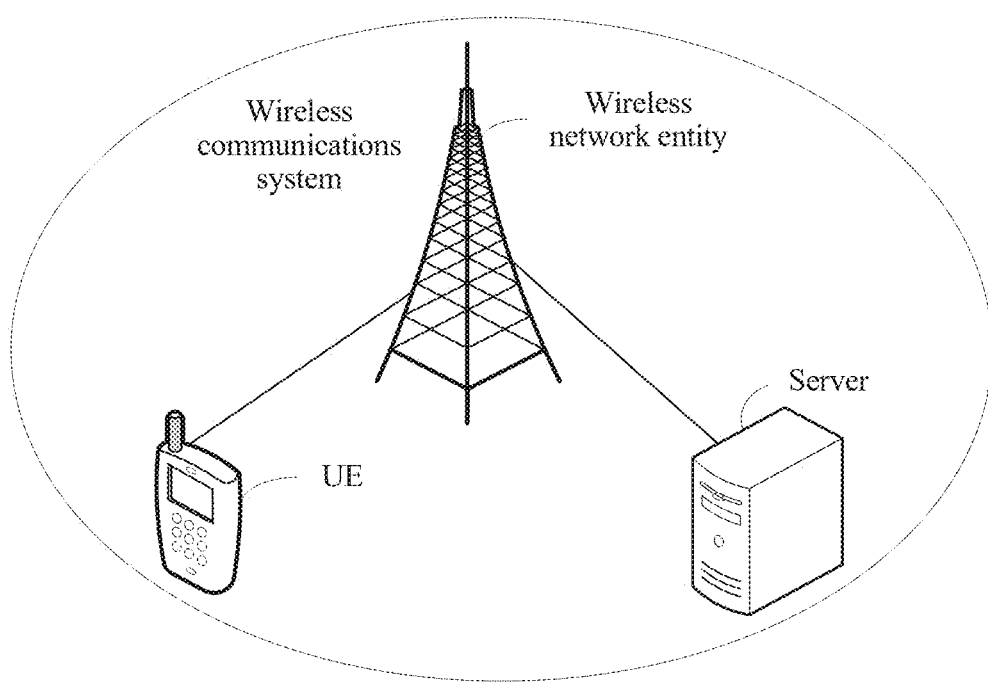
FIG. 20 is a block diagram of a wireless communications system according to an embodiment.

As shown in FIG. 20, this embodiment provides a wireless communications system, where the wireless communications system may include the wireless network entity, the UE, and the server according to the foregoing Embodiment 3, and interaction between the UE and the server is performed by using the wireless network entity.

In the wireless communications system provided in this embodiment, the wireless network entity receives a detection registration request message sent by the UE or a server corresponding to a client in the UE, and the wireless network entity completes registration of the status detection according to the detection registration request message; and the wireless network entity performs the status detection, and sends a result of the status detection. The detection registration request message is used to request to register the status detection with the wireless network entity, and the status detection may include at least one of online detection or update detection.

Specifically, if the status detection is the online detection, the wireless network entity may take the place of the UE to perform the online detection after completing registration of the online detection. If the wireless network entity receives a protocol message reported by the UE, the wireless network entity may consider that the UE and the client in the UE are in an online state. The wireless network entity notifies the client in the UE that the server corresponding to the client is in an online state, and notifies the server that the client is in an online state. Compared with the prior art, in the online detection method, the wireless network entity directly determines, according to whether the protocol message reported by the UE is received, whether the client in the UE is in an online state, and the UE and the server do not need to send a detection packet to each other for detection. Therefore, an air interface resource can be saved, and power consumption of the UE can be reduced, where the air interface resource is wasted in the prior art when the UE sends a detection packet to the wireless network entity during online detection performed between the UE and the server.

If the status detection is the update detection, the wireless network entity may take the place of the UE to perform the update detection after completing registration of the update detection. The wireless network entity sends an update detection message to the server to detect whether the server obtains a new message, that is, to detect whether content in the server is updated. If the wireless network entity detects that the server obtains the new message, the wireless network entity instructs the UE to obtain the new message from the server. Compared with the prior art, in the update detection method, the wireless network entity directly sends the update detection message to the server for detection, and the UE and the server do not need to send a detection packet to each other for detection. Therefore, an air interface resource can be saved, and power consumption of the UE can be reduced, where the air interface resource is wasted in the prior art when the UE sends a detection packet to the wireless network entity during update detection performed between the UE and the server.

This embodiment provides a wireless communications system. A wireless network entity receives a detection registration request message sent by UE or a server corresponding to a client in UE, where the detection registration request message is used to request to register status detection with the wireless network entity, and the status detection includes at least one of online detection or update detection; the wireless network entity completes registration of the status detection according to the detection registration request message; and the wireless network entity performs the status detection, and sends a result of the status detection. According to the solutions, after the wireless network entity completes the registration that is of the status detection and initiated by the UE or the server corresponding to the client in the UE, the wireless network entity may perform the status detection, and send the result of the status detection, that is, the wireless network entity may take the place of the UE to perform the status detection. Therefore, compared with a prior-art method in which the UE needs to periodically send a detection packet for status detection, the status detection method provided in this embodiment can change current situations in which the UE frequently establishes an air interface connection to the wireless network entity, and an air interface connection is maintained between the UE and the wireless network entity for a long time.

It may be clearly understood by persons skilled in the art that, for the purpose of convenient and brief description, division of the foregoing function modules is used as an example for description. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior aft, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments. The foregoing storage medium includes: any medium that can store program code, such as a universal serial bus (USB) flash drive, a removable hard disk, a ROM (Read-Only Memory), a RAM (Random Access Memory), a magnetic disk, or an optical disc.

The foregoing descriptions are merely specific implementation manners of the present embodiments, but are not intended to limit the protection scope of the present embodiments. Any variation or replacement readily figured out by persons skilled in the art within the technical scope disclosed in the present embodiments shall fall within the protection scope of the present embodiments. Therefore, the protection scope of the present embodiments shall be subject to the protection scope of the claims.

What is claimed is:

1. A method comprising:
receiving, by a wireless network entity, a first detection registration request message sent by a user equipment (UE), wherein the first detection registration request message requests registration with the wireless network entity for status detection so that the wireless network entity performs the status detection for an application running on the UE, wherein the status detection is online detection that detects whether a server corresponding to the application is in an online state or is update detection that detects whether a new message arrives at the server, and wherein the first detection registration request message carries an indicator of a first status detection period for the wireless network entity to perform the status detection, the first status detection period being suggested by the UE;
completing, by the wireless network entity, the registration of the status detection according to the first detection registration request message, wherein completing the registration of the status detection comprises determining, by the wireless network entity according to the first status detection period suggested by the UE, a second status detection period provided by the wireless network entity;
performing, by the wireless network entity, the status detection; and
sending a result of the status detection.

2. The method according to claim 1, wherein the status detection is the online detection, and wherein performing, by the wireless network entity, the status detection, and sending the result of the status detection comprise:
obtaining, by the wireless network entity, a protocol message reported by the UE;
sending, by the wireless network entity, a first heartbeat notification message to the server corresponding to the application in the UE according to the protocol message, wherein the first heartbeat notification message indicates that the application in the UE is in an online state; and
sending, by the wireless network entity, a second heartbeat notification message to the application in the UE according to the protocol message, wherein the second heartbeat notification message indicates that the server is in an online state.

3. The method according to claim 1, wherein the status detection is the update detection, and wherein performing, by the wireless network entity, the status detection, and sending the result of the status detection comprise:
sending, by the wireless network entity, an update detection message to the server corresponding to the application in the UE;
receiving, by the wireless network entity, an update acknowledgement message sent by the server; and
sending, by the wireless network entity, an update notification message to the application in the UE, in response to the update acknowledgement message indicating that the server has obtained a new message, wherein the update notification message instructs the application in the UE to obtain the new message from the server.

4. The method according to claim 1, wherein completing, by the wireless network entity, the registration of the status detection according to the first detection registration request message further comprises:
sending, by the wireless network entity, a second detection registration request message to the server corresponding to the application in the UE, wherein the second detection registration request message carries an indicator of the second status detection period provided by the wireless network entity;
receiving, by the wireless network entity, a first detection registration acknowledgement message sent by the server, wherein the first detection registration acknowledgement message carries an indicator of a third status detection period accepted by the server; and
sending, by the wireless network entity, a second detection registration acknowledgement message to the UE, wherein the second detection registration acknowledgement message carries the indicator of the third status detection period accepted by the server.

5. The method of claim 4, wherein the second detection registration acknowledgement message further carries an identifier of the application, and an identifier of the UE.

6. The method of claim 4, wherein the first detection registration acknowledgement message further carries an identifier of the application and an identifier of the UE.

7. The method of claim 4, wherein the second detection registration request message comprises an identifier of the application, an identifier of the UE, an address of the server, and the indicator of the second status detection period provided by the wireless network entity.

8. A method comprising:
sending, by a user equipment (UE), a detection registration request message to a wireless network entity, wherein the detection registration request message requests registration with the wireless network entity so that the wireless network entity performs status detection for an application running on the UE, wherein the detection registration request message carries a first status detection period suggested by the UE for the wireless network entity to perform the status detection, and wherein the status detection is online detection that detects whether a server corresponding to the application is in an online state or is update detection that detects whether a new message arrives at the server;
receiving, by the UE from the wireless network entity, a detection registration acknowledgement message carrying an indicator of a second status detection period accepted by the server corresponding to the application in the UE, an identifier of the application, and an identifier of the UE; and
receiving, by the UE, a result of the status detection sent by the wireless network entity.

9. The method according to claim 8, wherein the status detection is the online detection, wherein the method further comprises reporting, by the UE, a protocol message to the wireless network entity, before receiving, by the UE, the result of the status detection sent by the wireless network entity, and wherein receiving, by the UE, the result of the status detection sent by the wireless network entity comprises:
receiving, by the UE, a heartbeat notification message sent by the wireless network entity, wherein the heartbeat notification message indicates that the server is in an online state.

10. The method according to claim 8, wherein the status detection is the update detection, and wherein receiving, by the UE, the result of the status detection sent by the wireless network entity comprises:
receiving, by the UE, an update notification message sent by the wireless network entity, wherein the update notification message indicates that the server has obtained a new message; and wherein the method further comprises obtaining, by the UE, the new message from the server according to the update notification message, after receiving, by the UE, the update notification message sent by the wireless network entity.

11. A wireless network entity comprising:
a transmitter;
a receiver;
a processor; and
a non-transitory computer readable storage medium storing a program for execution by the processor, the program including instructions to:
  receive, using the receiver, a first detection registration request message sent by a user equipment (UE), wherein the first detection registration request message requests registration with the wireless network entity for status detection that is to be performed by the wireless network entity for an application running on the UE, wherein the first detection registration request message carries an indicator of a first status detection period suggested by the UE for the wireless network entity to perform the status detection, and wherein the status detection is online detection that detects whether a server corresponding to the application is in an online state or update detection that detects whether a new message arrives at the server;
  complete, using the processor, the registration of the status detection according to the first detection registration request message, comprising instructions to determine, according to the first status detection period, a second status detection period provided by the wireless network entity;
  perform, using the processor, the status detection; and
  send, using the transmitter, a result of the status detection.

12. The wireless network entity according to claim 11, wherein the status detection is the online detection, and wherein the instructions further comprise instructions to:
  obtain, using the receiver, a protocol message reported by the UE;
  send, using the transmitter, a first heartbeat notification message to the server according to the protocol message obtained by the wireless network entity; and
  send, using the transmitter, a second heartbeat notification message to the application in the UE according to the protocol message obtained by the wireless network entity, wherein the first heartbeat notification message indicates that the application in the UE is in an online state, and wherein the second heartbeat notification message indicates that the server is in an online state.

13. The wireless network entity according to claim 11, wherein the status detection is the update detection, and wherein the instructions further comprise instructions to:
  send, using the transmitter, an update detection message to the server;
  receive, using the receiver, an update acknowledgement message sent by the server; and
  send, using the transmitter, an update notification message to the application in the UE, in response to the update acknowledgement message indicating that the server has obtained a new message, wherein the update notification message instructs the application in the UE to obtain the new message from the server.

14. The wireless network entity according to claim 11, wherein the instructions further comprise instructions to:
  receive, using the receiver, a third detection registration request message sent by the server, wherein the third detection registration request message carries information that indicates a third status detection period provided by the server;
  determine, according to the information that indicates the third status detection period provided by the server, the second status detection period provided by the wireless network entity;
  send, using the transmitter, a fourth detection registration request message to the UE;
  receive, using the receiver, a third detection registration acknowledgement message sent by the UE; and
  send, using the transmitter, a fourth detection registration acknowledgement message to the server, wherein the fourth detection registration request message carries the third status detection period accepted by the wireless network entity.

15. The wireless network entity of claim 14, wherein the fourth detection registration request message carries the indicator of the second status detection period provided by the wireless network entity.

16. The wireless network entity of claim 14, wherein the fourth detection registration acknowledgement message further carries address information of the server and authentication information of the UE in the server.

17. A user equipment (UE), comprising:
a transmitter;
a receiver;
a processor; and
a non-transitory computer readable storage medium storing a program for execution by the processor, the program including instructions to:
  send, using the transmitter, a detection registration request message to a wireless network entity, wherein the detection registration request message requests registration with the wireless network entity so that the wireless network entity performs status detection for an application running on the UE, wherein the detection registration request message carries a first status detection period suggested by the UE, and wherein the status detection is online detection that detects whether a server corresponding to the application is in an online state or update detection that detects whether a new message arrives at the server;
  receive, from the wireless network entity using the receiver, a detection registration acknowledgement message carrying an indicator of a second status detection period accepted by the server corresponding to the application in the UE, an identifier of the application, and an identifier of the UE; and
  receive, using the transmitter, a result of the status detection sent by the wireless network entity.

18. The UE according to claim 17, wherein the status detection is the online detection, and wherein the instructions further comprise instructions to:
  report, using the transmitter, a protocol message to the wireless network entity before receiving the result of the status detection sent by the wireless network entity; and
  receive, using the receiver, a heartbeat notification message sent by the wireless network entity, wherein the heartbeat notification message indicates that the server is in an online state.

19. The UE according to claim 17, wherein the status detection is the update detection, and wherein the instructions further comprise instructions to:
- receive, using the receiver, an update notification message sent by the wireless network entity, wherein the update notification message indicates that the server has obtained a new message; and
- obtain, using the receiver, the new message from the server according to the update notification message after receiving the update notification message sent by the wireless network entity.

* * * * *